(12) United States Patent
Kim et al.

(10) Patent No.: US 8,252,886 B2
(45) Date of Patent: Aug. 28, 2012

(54) RESIN COMPOSITION FOR SHEET PRODUCTS

(75) Inventors: Jaekoo Kim, Daejeon (KR); Myungahn Ok, Daejeon (KR); Inhun Son, Daejeon (KR); Kangmin Jung, Seongnam-si (KR); Kwangjin Chung, Daejeon (KR)

(73) Assignee: SK Innovation Co., Ltd. (KR)

( * ) Notice: Subject to any disclaimer, the term of this patent is extended or adjusted under 35 U.S.C. 154(b) by 0 days.

(21) Appl. No.: 13/224,473

(22) Filed: Sep. 2, 2011

(65) Prior Publication Data

US 2012/0059078 A1 Mar. 8, 2012

(30) Foreign Application Priority Data

Sep. 3, 2010 (KR) .................. 10-2010-0086571

(51) Int. Cl.
*C08G 64/00* (2006.01)
*C08G 63/02* (2006.01)

(52) U.S. Cl. ......... 528/196; 521/189; 524/297; 524/315

(58) Field of Classification Search .................. 521/189; 524/297, 315
See application file for complete search history.

(56) References Cited

U.S. PATENT DOCUMENTS

| 4,145,525 | A | 3/1979 | Dixon et al. |
| 2004/0017121 | A1 | 1/2004 | Bailey et al. |

FOREIGN PATENT DOCUMENTS

| EP | 1111007 | 6/2001 |
| EP | 1264860 | 12/2002 |
| WO | 2006061237 | 6/2006 |
| WO | 2006103214 | 10/2006 |

OTHER PUBLICATIONS

European Office Action—EP11179702 dated Dec. 14, 2011.

*Primary Examiner* — Terressa Boykin
(74) *Attorney, Agent, or Firm* — Cantor Colburn LLP

(57) ABSTRACT

Provided is a resin composition for a sheet to an eco-friendly poly(alkylene carbonate) resin composition containing a poly (alkylene carbonate) resin developed by efficiently utilizing carbon dioxide, which is a major contributor to global warming, as a main material, and including an strength controller, a flexibilizer and a filler. The present invention can solve problems related to environment harmfulness of the existing polyvinyl chloride resin products and have excellent flame-proofing property and stretching property. In addition, the present invention can employ a calender processing method, which allows mass production and overcome a small production type extrusion processing method, which is regarded as the biggest disadvantage of thermoplastics emerging as alternatives for the existing polyvinyl chloride products.

12 Claims, No Drawings

RESIN COMPOSITION FOR SHEET PRODUCTS

CROSS-REFERENCE TO RELATED APPLICATIONS

This application claims priority under 35 U.S.C. §119 to Korean Patent Application No. 10-2010-0086571, filed on Sep. 3, 2010 and Korean Patent Application No. 10-2011-0088127, filed on Aug. 31, 2011, in the Korean Intellectual Property Office, the disclosure of which is incorporated herein by reference in its entirety.

TECHNICAL FIELD

The present invention relates to a resin composition for a sheet, and more particularly to an eco-friendly poly(alkylene carbonate) resin composition containing a poly(alkylene carbonate) resin capable of efficiently utilizing carbon dioxide, which is a major contributor to global warming, as a main material, and containing three or more kinds selected from the group consisting of an strength controller, a flexibilizer, a dimensional stabilizer, an impact modifier, a filler, a obliterating power improver, a foaming agent, a foaming cell control agent, a flame retardant, an flameproofing agent, an antifogging agent, and a lubricant.

BACKGROUND

A polyvinyl chloride material used in housing of human or office spaces has been requested or restricted such that a polyvinyl chloride resin is not used for toys for children, food packing, bags for Ringer in hospitals, or the like, by the Ministry of Environment and the authorities concerned, due to environmental pollution and harmfulness to the human body, inside or outside the country. Furthermore, the use thereof has been steadily restricted abroad, particularly in Europe, such as, regulating import and export customs clearance of products containing the polyvinyl chloride resin. The main reason is that products made of polyvinyl chloride materials are difficult to recycle, and thus are incinerated as waste, thereby generating a large amount of harmful gases such as hydrogen chloride (HCl), and dioxin, which are fatal to the human body.

Specifically, since the polyvinyl chloride material is alone not made into products fundamentally, processing additives, such as plasticizers, stabilizers, flame retardants, dyes, and the like, are used in order to solver the above problems, and these materials incur the harmful gases and dioxin. Among the processing additives, a phthalatebased plasticizer used in order to impart workability and flexibility to the polyvinyl chloride is an environmental hormone, and thus has a fatal effect on the human and natural ecosystem. Therefore, four plasticizer maker companies made an agreement in respect to restricting the use of polyvinyl chloride in the country. Stabilizers and dyes have been determined to be very fatal to the human body and natural ecosystem since they contain heavy metals that are fatal to the human body, and thus, the use thereof is restricted.

Alternatives using eco-friendly common plastics have been developed in order to solve problems of these polyvinyl chloride products. However, the alternatives have problems related to physical properties; for example, they can be easily broken in the winder time due to deficiency in flexibility. Furthermore, processing additives need to be additively used since they are poor in printability, cut-ability, and adhesive property thereof, and thus, incur an increase in costs. Moreover, economic feasibility is lowered due to production by extrusion processing and high price of materials themselves.

SUMMARY

An embodiment of the present invention is directed to providing an object of overcoming deterioration in post processability, such as printability, cut-ability, adhesive property, or the like, and deterioration in physical properties of products made of modified polyethylenes, which are eco-friendly common plastics, such as polypropylene, polyethylene terephthalate, polyurethane, thermoplastic olefin based resin, acrylic resin, and the like, as alternatives of polyvinyl chlorides, by using a poly(alkylene carbonate) resin as a main material and adding a minimal processing additives not harmful to the human body and natural ecosystem.

An embodiment of the present invention is directed to providing an object of allowing products made of a poly(alkylene carbonate) resin composition according to the present invention to have excellent a flameproofing property and improved smoke density, thereby preventing a large amount of fatal and harmful gases, which are unfavorable as an interior material, from being generated at the time of a fire.

An embodiment of the present invention is directed to providing an object of overcoming a weakness that a pellet type polymer material is difficult in calender processing and thereby to remarkably lower production costs as compared with extrusion processing, performing a process at lower temperature than a polyvinyl chloride resin and thereby improve the workability, and lowering specific gravity and thereby reduce the manufacturing costs of production companies.

In one general aspect, a resin composition for a sheet includes: 0.1 to 100 parts by weight of an strength controller, 0.1 to 50 parts by weight of a flexibilizer, 0.1 to 30 parts by weight of a obliterating power improver, 0.1 to 200 parts by weight of a filler, and 0.1 to 5 parts by weight of a lubricant, based on 100 parts by weight of a poly(alkylene carbonate) resin.

The resin composition for a sheet may further include 0.1 to 5 parts by weight of a compatibilizer based on 100 parts by weight of the poly(alkylene carbonate) resin.

The resin composition for a sheet may further include 0.1 to 30 parts by weight of an impact modifier based on 100 parts by weight of the poly(alkylene carbonate) resin.

The resin composition for a sheet may further include 0.5 to 20 parts by weight of a foaming agent or 0.1 to 200 parts by weight of a flame retardant based on 100 parts by weight of the poly(alkylene carbonate) resin.

The resin composition for a sheet according to the present invention necessarily includes the additives having the above content ranges together with the poly(alkylene carbonate) resin, thereby improving post processability, such as mechanical property, processability, printability, cut-ability, adhesive property, or the like, or anti-flame property, and allows calender processing, resulting in remarkably lowering production cost as compared with extrusion processing, thereby improving economic feasibility.

The strength controller is a polymer resin having a high glass transition temperature, which is added in order to improve mechanical property (tensile strength, tear strength, or the like) of plastics having a low glass transition temperature (Tg), and functions to additively improve heat-resistant property and dimensional stability of products besides the mechanical property. The strength controller may include a polyolefin based resin such as polyethylene and polypropylene, an ethylene vinyl acetate resin, a polymethylmethacrylate resin, polylactic acid, or a biodegradable resin of modified polyester resins, and be any one or more selected from linear low density polyethylene, random polypropylene, polymethylmethacrylate, polylactic acid, and ethylene vinyl acetate. The flexibilizer may be any one or more selected from acrylate based compounds and glutaric acid compounds.

The strength controller is in a pellet type or a liquid type, and a modified polyester or thermoplastic copolyester elastomer having a number average molecular weight of 200 to 500 may be used as the strength controller.

The strength controller is contained in 0.1 to 100 parts by weight based on 100 parts by weight of the poly(alkylene carbonate) resin. If the concentration of the strength controller deviates from the above range, a synergy effect in improvement of physical property due to combination with other components is decreased, and thus, improvement in the heat resistant property or dimensional stability of the products can not be expected, and physical properties such as tensile strength, tear strength and the like, are deteriorated.

In addition, in a case where the polyolefin based resin is used as the strength controller, the compatibilizer may be used. The compatibilizer can function to obtain a blend having a uniform compositional ratio and perform an important role in improvement of physical properties, by improving fusion or melting with polyolefin.

As the compatibilizer, a polyethylene based type including polyethylene and maleic anhydride, a polypropylene based type including polypropylene and maleic anhydride, an ethylene vinyl acetate type including ethylene vinyl acetate, polystyrene, and maleic anhydride, or a linear low density polyethylene type including linear low density polyethylene and maleic anhydride. Here, the linear low density polyethylene based compounds may have a melt index (190° C., ASTM D1238) of 0.3 to 0.9 g/10 min and a density of 0.5~2.0 g/cm$^3$.

The compatibilizer may be included in 0.1 to 5 parts by weight based on 100 parts by weight of the poly(alkylene carbonate) resin, thereby improving physical properties such as tensile strength, tear strength, elongation, and the like, processability, dimensional stability, and cold resistant property through combination with other components.

The filler may be an inorganic filler including calcium carbonate, talc, white clay, titanium dioxide, magnesium carbonate, barium carbonate, aluminum hydroxide, calcium hydroxide, magnesium hydroxide, zinc oxide, white carbon, or amorphous silica, or an organic filler including a melamine resin or an urea resin.

The filler is contained in 0.1 to 200 parts by weight based on 100 parts by weight of the poly(alkylene carbonate) resin. If the concentration of the filler deviates from the above range, a synergy effect due to combination with other components may be decreased, and there may be deterioration in rigidity of products and shrinkage and deformation of the products.

The lubricant is added to plastics during processing and finely coated on surfaces of the plastics, and thereby to reduce friction between polymer processing apparatuses and between polymer-polymer. As a result, the lubricant increases productivity of products, and prevents adhesion between plastics to facilitate the use of sheet or film typed products. The lubricant may be used for improving the heat resistant property of the final product, and preventing respective sheets from being adhered to each other at the time of winding the final product. The lubricant may be stearic acid or dioctyl terephthalate.

The lubricant is contained in 0.1 to 5 parts by weight based on 100 parts by weight of the poly(alkylene carbonate) resin.

If the concentration of the lubricant deviates from the above range, a melt viscosity is too low such that processability deteriorates, and thus, improvement in physical properties can not be expected through combination with other components.

Examples of the impact modifier may include any one or more selected from methylmethacrylate-butadiene-styrene (MBS) copolymer which is poor in heat resistant property, chemical resistant property, and weather resistant property but excellent in impact strength, acrylic based Impact modifier (AIM) which is lower than a butadiene type impact modifier in impact strength but excellent in heat resistant property and chemical resistant property, or chlorinated polyethylene (CPE) which is favorable in view of costs than physical properties. Here, as for the impact modifier for use in opacity, an apparent specific gravity is 0.25 g/cc or more, and grains not passing through #10 mesh are contained in 3 wt % and grains passing through #200 mesh are contained in 35 wt %. A volatile matter is contained in 1 wt % or less. The izod impact strength (ISO 180) is 50 kg·cm/cm or more (23° C. ¼") and 10 kg·cm/cm or more (−30° C. ¼"). As for the impact modifier for use in transparency, an apparent specific gravity is 0.32 g/cc, and grains not passing through #24 mesh are contained in 2 wt % and grains passing through #200 mesh are contained in 20 wt %. A volatile matter is contained in 1 wt % or less. The izod impact strength (ISO 180) is 80 kg·cm/cm or more (23° C.).

The impact modifier is contained in 0.1 to 5 parts by weight based on 100 parts by weight of the poly(alkylene carbonate) resin. If the concentration of the impact modifier deviates from the above range, a hardened product may be easily broken, which causes deterioration of durability thereof.

The foaming agent is an additive used in forming cells to prepare a foaming body, by inputting gas in polymer within a state where polymer materials and various kinds of sub-raw materials are added, in physical, chemical and mechanical methods, through regulation of conditions, such as temperature, pressure, time and the like, and thereby to forming cells, or artificially forming gas. Among chemical foaming agents, sodium bicarbonate, ammonium carbonate, ammonium bicarbonate, ammonium nitrite, an azide compound, sodium borohydride, soft metal, or the like, causes an endothermic reaction at the time of thermal decomposition. Inorganic foaming agents showing irregular decomposition and generating gas somewhat slowly may be used. Since the gas generated by decomposition of the foaming agent is almost carbon dioxide, the foaming agent may be used in manufacturing an open-cell structured foaming body due to large permeability thereof to the resin. The foaming agent may be used with an organic foaming agent including azodicarbonamide (ADCA), N,N'-dinitrosopentamethylenetetramine (DNPA), 4,4'-oxybis(benzenesulfonylhydrazide) (OBSH), p-toluenesulfonylhydrazide (TSH). Any one or more selected from the group consisting of inorganic foaming agents and organic foaming agents.

The foaming agent is contained in 0.5 to 20 parts by weight based on 100 parts by weight of the poly(alkylene carbonate) resin, and can improve light weight, elasticity, insulation property, soundproofing property, and absorbency, and provide an excellent appearance, through combination with other components within the above range.

The flame-retardant agent may be any one or more selected from the group consisting of phosphorus based compounds, silicon based compounds, halogen based compounds, and metal hydride compounds, and can give, to the products, impact relieving property, cushion feeling, excellent touch feeling, cost reduction, dimensional stability, adiabaticity, soundproofing property, buoyancy, absorbency, decorating property, or the like.

The flame retardant agent is contained in 0.1 to 200 parts by weight based on 100 parts by weight of the poly(alkylene carbonate) resin, thereby improving flame retardant property and flameproofing property, and expressing a synergy effect through combination with other components.

In the present invention, the flexibilizer is referred to a single molecular type liquid material or a polymer type solid material, which can be processed below a decomposition temperature of a polymer material or lower for use in improving processability of the polymer, and can be added to improve flexibility of the polymer material. The flexibilizer can minimize the generation of a frictional heat, improve physical properties such as elasticity, adhesive property, flexibility, and or the like, improve thermal stability of products, and easily melt a pallet type polymer material.

In the present invention, as the flexibilizer, DAIFATTY-101 or MTGA of the structural formula below may be used. Even though the optimum content of the flexibilizer, based on the poly(alkylene carbonate) resin, is a level of ⅙ as compared with a common phthalate based plasticizer used for the polyvinyl chloride resin, it exhibits mechanical properties and hardness equal to or superior to the common phthalate based plasticizer, and has excellent migrant resistant property (migration of plasticizer).

elasticity and enhancing dimensional stability. Examples of the elasticity provider may include NBR or modified polyurethane.

Meanwhile, moisture is condensed due to the breathing of contents packaged (package of mainly vegetables, fruits, and food) by a material mainly used in plastic wrap for package or difference of temperature between an inside surface and an outer surface of the packaging. As a result, the contents are scarcely seen when a customer purchases the products, and thus, freshness of the contents is difficult to confirm, which causes a purchase degree to be dropped. In addition, when the condensed moisture is contacted with the packaged contents, the contents may be easily spoiled. In the present invention, an antifogging agent can prevent these problems. A surfactant may be used as the antifogging agent.

In another general aspect, a resin composition for a sheet includes: 0.1 to 100 parts by weight of an strength controller, 0.1 to 50 parts by weight of a flexibilizer, 0.1 to 5 parts by weight of a compatibilizer, 0.1 to 30 parts by weight of a obliterating power improver, 0.1 to 200 parts by weight of a filler, and 0.1 to 5 parts by weight of a lubricant, based on 100 parts by weight of a poly(alkylene carbonate) resin.

In another general aspect, an eco-friendly poly(alkylene carbonate) resin composition for a decorative sheet includes at least one selected from the group consisting of 2 to 50 parts by weight of an strength controller, 2 to 50 parts by weight of a dimensional stabilizer, 0.1 to 30 parts by weight of a flexi-

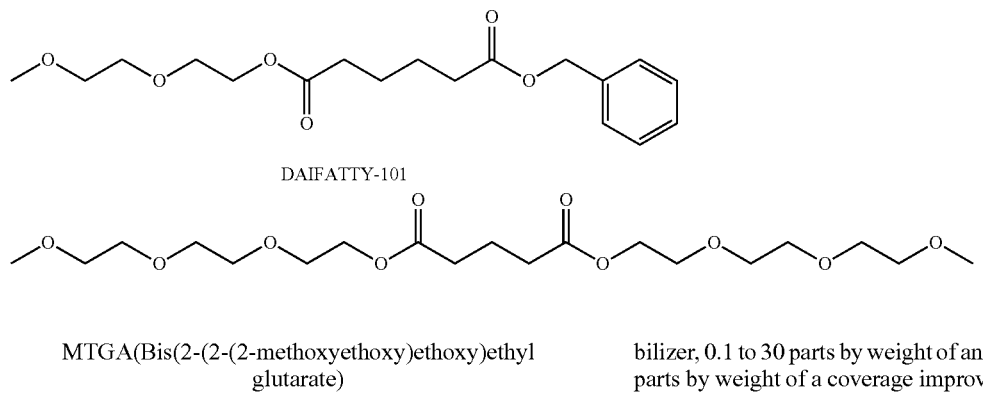

DAIFATTY-101

MTGA(Bis(2-(2-(2-methoxyethoxy)ethoxy)ethyl glutarate)

The flexibilizer also includes a solid type polyacrylic acid or polyacrylates obtained by a polymerization reaction or esterification reaction of acrylic acid or acrylates. Here, as the flexibilizer, an acrylic resin obtained by treating 60 to 85% of polymethylmethacrylate, 15 to 5% of polyethylacrylate, and 25 to 5% of polybutylacrylate with a polar solvent may be used in order to maximize mechanical properties and heat resistant property, and PA828 (LG Chemical) may be one example of the flexibilizer.

The flexibilizer is contained in 0.1 to 50 parts by weight based on 100 parts by weight of the poly(alkylene carbonate) resin, thereby remarkably improving fusion and processability through combination with other components, increasing elasticity, adhesive property, and flexibility, and enhancing thermal stability.

In the present invention, a obliterating power improver is for improving a whiteness, tinting strength, an aesthetic effect, and coverage, and is applicable to sheets for wall paper or decoration. An example of the coverage improve may be titanium dioxide, but not limited thereto.

In the present invention, an elasticity provider can improve durability, and particularly is applied to foaming products of synthetic leather, thereby maximizing an effect of improving bilizer, 0.1 to 30 parts by weight of an impact modifier, 5 to 30 parts by weight of a coverage improver, and 0.1 to 5 parts by weight of a filler, based on 100 parts by weight of a poly (alkylene carbonate) resin.

A poly(alkylene carbonate) resin (GreenPol) in the eco-friendly poly(alkylene carbonate) resin composition is excellent in tensile strength and tear strength, due to structural distinctiveness of itself and good miscibility with processing additives, and is remarkably excellent in particularly elongation (stretching property) and printability, as compared with common plastics. These physical properties are importantly required for use in a high-priced membrane in the decorative sheets. In particular, the poly(alkylene carbonate) resin (GreenPol) is excellent in a flameproofing characteristic, such as smoke density, by 1/600 of that of the common plastics.

Here, the eco-friendly poly(alkylene carbonate) resin composition for a decorative sheet may be used as a transparent or opaque soft decorative sheet, or a transparent or opaque hard decorative sheet, by combination with the strength controller, the dimensional stabilizer, the flexibilizer, the impact modifier, the obliterating power improver, or the lubricant.

The eco-friendly poly(alkylene carbonate) resin composition for the transparent soft decorative sheet includes 2 to 50 parts by weight of the strength controller, 2 to 50 parts by weight of the dimensional stabilizer, 0.1 to 30 parts by weight of the flexibilizer, and 0.1 to 5 parts by weight of the lubricant.

The eco-friendly poly(alkylene carbonate) resin composition for the opaque soft decorative sheet includes 2 to 50 parts by weight of the strength controller, 2 to 50 parts by weight of the dimensional stabilizer, 0.1 to 30 parts by weight of the flexibilizer, 5 to 30 parts by weight of the obliterating power improver, and 0.1 to 5 parts by weight of the lubricant.

The eco-friendly poly(alkylene carbonate) resin composition for the transparent hard decorative sheet includes 2 to 50 parts by weight of the strength controller, 2 to 50 parts by weight of the dimensional stabilizer, 0.1 to 30 parts by weight of the impact modifier, and 0.1 to 5 parts by weight of the lubricant.

The eco-friendly poly(alkylene carbonate) resin composition for the opaque hard decorative sheet includes 2 to 50 parts by weight of the strength controller, 2 to 50 parts by weight of the dimensional stabilizer, 0.1 to 30 parts by weight of the flexibilizer, 5 to 30 parts by weight of the obliterating power improver, and 0.1 to 5 parts by weight of the lubricant.

The poly(alkylene carbonate) resin is excellent in tensile strength and tear strength, due to structural distinctiveness of itself and good miscibility with processing additives, and is remarkably excellent in particularly elongation (stretching ratio) and printability, as compared with common plastics. These physical properties are importantly required for use in a high-priced membrane in the decorative sheets. Also, the poly(alkylene carbonate) resin is excellent in a flameproofing characteristic (particularly smoke density), by ¹⁄₆₀₀ of that of the common plastics.

The poly(alkylene carbonate is prepared by copolymerization of carbon dioxide and at least one epoxide compound selected from the group consisting of (C2-C20)alkyleneoxide substituted or unsubstituted with halogen, (C1-C20)alkyloxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkyloxy, (C6-C20)aryloxy or (C6-C20)ar(C1-C20)alkyl(aralkyl)oxy; and (C8-C20)styreneoxide substituted or unsubstituted with halogen, (C1-C20)alkyloxy, (C6-C20)aryloxy, (C6-C20)ar(C1-C20)alkyl(aralkyl)oxy, or (C1-C20)alkyl.

Here, the epoxide compounds may be at least one selected from the group consisting of ethylene oxide, propylene oxide, butene oxide, pentene oxide, hexene oxide, octen oxide, decene oxide, dodecene oxide, tetradecene oxide, hexadecene oxide, octadecene oxide, butadiene monoxide, 1,2-epoxide-7-octene, epifluorohydrine, epichlorohydrine, epibromohydrine, glycidyl methyl ether, glycidyl ethyl ether, glycidyl normal propyl ether, glycidyl sec-butyl ether, glycidyl normal or isopentyl ether, glycidyl normal hexyl ether, glycidyl normal heptyl ether, glycidyl normal octyl or 2-ethyl-hexyl ether, glycidyl normal or isononyl ether, glycidyl normal decyl ether, glycidyl normal dodecyl ether, glycidyl normal tetradecyl ether, glycidyl normal hexadecyl ether, glycidyl normal octadecyl ether, glycidyl normal icocyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbonene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyl oxymethyl oxirane, glycidylmethylphenyl ether, chlorophenyl-2,3-epoxide propyl ether, epoxypropyl methoxyphenyl ether, biphenyl glycidyl ether, glycidyl naphthyl ether, glycidyl acetic acid ester, glycidyl propionate, glycidyl butanoate, glycidyl normal pentanoate, glycidyl normal hexanoate, glycidyl heptanoate, glycidyl normal octanoate, glycidyl 2-ethyl hexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl icosanoate.

Also, the poly alkylene carbonate may be represented by Chemical Formula 1 below.

[Chemical Formula 1]

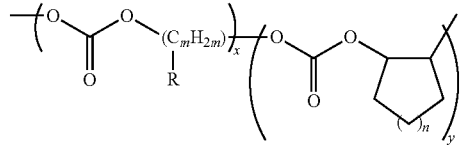

[In Chemical Formula 1, m represents an integer of 2 to 10, n represents an integer of 1 to 3, R represents hydrogen, (C1-C4)alkyl or —CH₂—O—R' (R' is (C1-C8)alkyl), x represents an integer of 5 to 100, y represents an integer of 0 to 100.]

The alkylene in the polyalkylene carbonate of the present invention may include ethylene oxide, propylene, 1-butylene, cyclohexene oxide, alkylglycidyl ether, n-butyl, n-octyl, and the like, and is not limited thereto.

The polyalkylene carbonate is prepared by alternating copolymerization of carbon dioxide and at least one epoxide compound selected from the group consisting of (C2-C20) alkyleneoxide substituted or unsubstituted with halogen, (C1-C20)alkyloxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkyloxy, (C6-C20)aryloxy or (C6-C20)ar(C1-C20)alkyl(aralkyl)oxy; and (C8-C20)styreneoxide substituted or unsubstituted with halogen, (C1-C20)alkyloxy, (C6-C20)aryloxy, (C6-C20)ar (C1-C20)alkyl(aralkyl)oxy, or (C1-C20)alkyl, by using a complex compound of Chemical Formula 2 below as a catalyst, in the presence of a polymer compound having a hydroxyl or carboxyl acid group at an terminal or a side chain thereof.

[Chemical Formula 2]

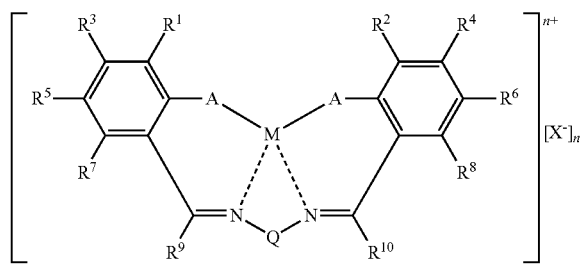

[In Chemical Formula 2,
M represents trivalent cobalt or trivalent chromium;
A represents an oxygen or sulfur atom;
Q represents a diradical linking two nitrogen atoms;
$R^1$ to $R^{10}$ independently represent hydrogen; halogen; (C1-C20)alkyl; (C1-C20)alkyl containing one or more of halogen, nitrogen, oxygen, silicon, sulfur and phosphor; (C2-C20)alkenyl; (C2-C20)alkenyl containing one or more of halogen, nitrogen, oxygen, silicon, sulfur and phosphor; (C1-C20) alkyl(C6-C20)aryl; (C1-C20)alkyl(C6-C20)aryl containing one or more of halogen, nitrogen, oxygen, silicon, sulfur and phosphor; (C6-C20)aryl(C1-C20)alkyl; (C6-C20)aryl(C1-C20)alkyl containing one or more of halogen, nitrogen, oxygen, silicon, sulfur and phosphor; (C1-C20)alkoxy; (C6-C30)aryloxy; formyl; (C1-C20)alkylcarbonyl; (C6-C20)arylcarbonyl; or a metalloid radical of group 14 metal substituted with hydrocarbyl;

two of $R^1$ to $R^{10}$ may be linked to each other to form a ring;

at least one of hydrogens contained in $R^1$ to $R^{10}$ and Q is a proton group selected from the group consisting of Chemical Formulas a, b, and c;

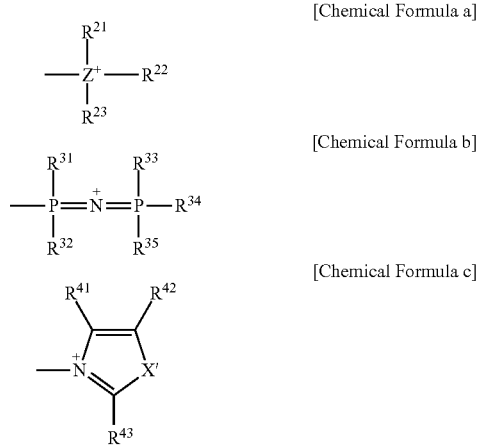

[Chemical Formula a]

[Chemical Formula b]

[Chemical Formula c]

$X^-$ represents independently a halide ion; $HCO_3^-$; $BF_4^-$; $ClO_4^-$; $NO_3^-$; $PF_6^-$; (C6-C20)aryloxy anion; (C6-C20)aryloxy anion containing one or more of halogen atom, nitrogen atom, oxygen atom, silicon atom, sulfur atom, and phosphor atom; (C1-C20)alkylcarboxyl anion; (C1-C20)alkyl carboxyl anion containing one or more of halogen atom, nitrogen atom, oxygen atom, silicon atom, sulfur atom, and phosphor atom; (C6-C20)arylcarboxyl anion; (C6-C20)arylcarboxyl anion containing one or more of halogen atom, nitrogen atom, oxygen atom, silicon atom, sulfur atom, and phosphor atom; (C1-C20)alkoxy anion; (C1-C20)alkoxy anion containing one or more of halogen atom, nitrogen atom, oxygen atom, silicon atom, sulfur atom, and phosphor atom; (C1-C20)alkylcarbonate anion; (C1-C20)alkylcarbonate anion containing one or more of halogen atom, nitrogen atom, oxygen atom, silicon atom, sulfur atom, and phosphor atom; (C6-C20)arylcarbonate anion; (C6-C20)arylcarbonate anion containing one or more of halogen atom, nitrogen atom, oxygen atom, silicon atom, sulfur atom, and phosphor atom; (C1-C20)alkylsulfonate anion; (C1-C20)alkylsulfonate anion containing one or more of halogen atom, nitrogen atom, oxygen atom, silicon atom, sulfur atom, and phosphor atom; (C1-C20)alkylamido anion; (C1-C20)alkylamido anion containing one or more of halogen atom, nitrogen atom, oxygen atom, silicon atom, sulfur atom, and phosphor atom; (C6-C20)arylamido anion; (C6-C20)arylamido anion containing one or more of halogen atom, nitrogen atom, oxygen atom, silicon atom, sulfur atom, and phosphor atom; (C1-C20)alkylcarbamate anion; (C1-C20)alkylcarbamate anion containing one or more of halogen atom, nitrogen atom, oxygen atom, silicon atom, sulfur atom, and phosphor atom; or (C6-C20)arylcarbamate anion; (C6-C20)arylcarbamate anion containing one or more of halogen atom, nitrogen atom, oxygen atom, silicon atom, sulfur atom, and phosphor atom;

Z is nitrogen or phosphor atom;

$R^{21}$, $R^{22}$, $R^{23}$, $R^{31}$, $R^{32}$, $R^{33}$, $R^{34}$ and $R^{35}$ independently represent (C1-C20)alkyl; (C1-C20)alkyl containing one or more of halogen, nitrogen, oxygen, silicon, sulfur and phosphor; (C2-C20)alkenyl; (C2-C20)alkenyl containing one or more of halogen, nitrogen, oxygen, silicon, sulfur and phosphor; (C1-C20)alkyl(C6-C20)aryl; (C1-C20)alkyl(C6-C20)aryl containing one or more of halogen, nitrogen, oxygen, silicon, sulfur and phosphor; (C6-C20)aryl(C1-C20)alkyl; (C6-C20)aryl(C1-C20)alkyl containing one or more of halogen, nitrogen, oxygen, silicon, sulfur and phosphor; or a metalloid radical of group 14 metal substituted with hydrocarbyl; and two of $R^{21}$, $R^{22}$ and $R^{23}$, or two of $R^{31}$, $R^{32}$, $R^{33}$, $R^{34}$ and $R^{35}$ may be linked to each other to form a ring;

$R^{41}$, $R^{42}$ and $R^{43}$ independently represent hydrogen; (C1-C20)alkyl; (C1-C20)alkyl containing one or more of halogen, nitrogen, oxygen, silicon, sulfur and phosphor; (C2-C20)alkenyl; (C2-C20)alkenyl containing one or more of halogen, nitrogen, oxygen, silicon, sulfur and phosphor; (C1-C20)alkyl(C6-C20)aryl; (C1-C20)alkyl(C6-C20)aryl containing one or more of halogen, nitrogen, oxygen, silicon, sulfur and phosphor; (C6-C20)aryl(C1-C20)alkyl; (C6-C20)aryl(C1-C20)alkyl containing one or more of halogen, nitrogen, oxygen, silicon, sulfur and phosphor; or a metalloid radical of group 14 metal substituted with hydrocarbyl; and two of R41, R42 and R43 may be linked to each other to form a ring;

X' represents oxygen atom, sulfur atom, or N—R (here, R represents (C1-C20)alkyl);

n represents an integer obtained by adding one to the total number of proton groups contained in $R^1$ to $R^{10}$ and Q;

$X^-$ may coordinate M; and nitrogen atom of imine may be decoordinated from M.]

In another general aspect, an eco-friendly poly(alkylene carbonate) resin composition for an interior sheet includes at least one selected from the group consisting of 2 to 50 parts by weight of an strength controller, 2 to 50 parts by weight of a dimensional stabilizer, 2 to 70 parts by weight of a flexibilizer, 0.1 to 30 parts by weight of an impact modifier, 5 to 30 parts by weight of a obliterating power improver, 0.1 to 200 parts by weight of a filler, 0.5 to 20 parts by weight of a foaming agent, 0.1 to 200 parts by weight of a flame retardant agent or a flameproofing agent, and 0.1 to 5 parts by weight of a lubricant by weight of a filler, based on 100 parts by weight of a poly(alkylene carbonate) resin.

Here, the eco-friendly poly(alkylene carbonate) resin for an interior sheet may be used as a transparent or opaque soft interior sheet, a transparent or opaque hard interior sheet, a flameproofing interior sheet, or a foaming interior sheet, by combination with the strength controller, the dimensional stabilizer, the flexibilizer, the impact modifier, the obliterating power improver, the filler, the foaming agent, the flame retardant agent, the flameproofing agent, or the lubricant.

A poly(alkylene carbonate) resin (Green Pol) in the eco-friendly poly(alkylene carbonate) resin composition is excellent in tensile strength and tear strength, due to structural distinctiveness of itself and good miscibility with processing additives, and is remarkably excellent in particularly transparency and a flameproofing characteristic (particularly, smoke density), as compared with competitive products. In addition, the poly(alkylene carbonate) resin (GreenPol) has a unique advantage in that the hardness thereof can be easily regulated, as compared with other common plastics, even when a small amount of the flexibilizer (softener) self-developed by SK Energy Company is used, and thus, can realize from ultra soft products to ultra hard products.

The eco-friendly poly(alkylene carbonate) resin composition for a transparent soft interior sheet includes 2 to 50 parts by weight of the strength controller, 2 to 50 parts by weight of the dimensional stabilizer, 2 to 70 parts by weight of the flexibilizer, and 0.1 to 5 parts by weight of the lubricant.

The eco-friendly poly(alkylene carbonate) resin composition for an opaque soft interior sheet includes 2 to 50 parts by weight of the strength controller, 2 to 50 parts by weight of the dimensional stabilizer, 2 to 70 parts by weight of the flexibilizer, 5 to 30 parts by weight of the obliterating power improver, 0.1 to 200 parts by weight of the lubricant, and 0.1 to 5 parts by weight of the lubricant.

The eco-friendly poly(alkylene carbonate) resin composition for a transparent hard interior sheet includes 2 to 50 parts by weight of the strength controller, 2 to 50 parts by weight of the dimensional stabilizer, 0.1 to 30 parts by weight of the impact modifier, and 0.1 to 5 parts by weight of the lubricant.

The eco-friendly poly(alkylene carbonate) resin composition for the flameproofing interior sheet may further include 0.1 to 200 parts by weight of the flame retardant agent or the flameproofing agent, in addition to the eco-friendly poly(alkylene carbonate) resin composition for the transparent or opaque soft interior sheet or the transparent or opaque hard interior sheet.

The eco-friendly poly(alkylene carbonate) resin composition for the foaming interior sheet includes 2 to 50 parts by weight of the strength controller, 2 to 50 parts by weight of the dimensional stabilizer, 2 to 70 parts by weight of the flexibilizer, 5 to 30 parts by weight of the obliterating power improver, 0 to 200 parts by weight of the filler, 0.5 to 20 parts by weight of the foaming agent, and 0.1 to 5 parts by weight of the lubricant.

In another general aspect, an eco-friendly poly(alkylene carbonate) resin composition for a tarpaulin includes at least one selected from the group consisting of 2 to 50 parts by weight of an strength controller, 2 to 100 parts by weight of a flexibilizer, 0.1 to 30 parts by weight of an impact modifier, 0.1 to 200 parts by weight of a filler, 0.1 to 5 parts by weight of a lubricant, and 0.1 to 20 parts by weight of a dye, based on 100 parts by weight of a poly(alkylene carbonate) resin.

Here, the eco-friendly poly(alkylene carbonate) resin composition for a tarpaulin may be used as a transparent or opaque soft tarpaulin or a transparent or opaque hard tarpaulin, by combination with 2 to 50 parts by weight of the strength controller, 2 to 100 parts by weight of the flexibilizer, 0.1 to 30 parts by weight of the impact modifier, 0.1 to 200 parts by weight of the filler, 0.1 to 5 parts by weight of the lubricant, or the dye.

A poly(alkylene carbonate) resin (Green Pol) in the eco-friendly poly(alkylene carbonate) resin composition is excellent in tensile strength and abrasive strength, due to structural distinctiveness of itself and good miscibility with processing additives. In addition, the poly(alkylene carbonate) resin GreenPol) has advantages in that the hardness thereof can be easily regulated even with a small amount of the flexibilizer developed by SK Energy Company and scheduled to be filed as a patent application, and adhesive strength with fabrics is very excellent.

The eco-friendly poly(alkylene carbonate) resin composition for the transparent soft tarpaulin includes 2 to 50 parts by weight of the strength controller, 2 to 100 parts by weight of the flexibilizer, 0.1 to 5 parts by weight of the lubricant, and 0.1 to 20 parts by weight of the dye, based on 100 parts by weight of a poly(alkylene carbonate) resin.

The eco-friendly poly(alkylene carbonate) resin composition for the opaque soft tarpaulin includes 2 to 50 parts by weight of the strength controller, 2 to 100 parts by weight of the flexibilizer, 0.1 to 200 parts by weight of the filler, 0.1 to 5 parts by weight of the lubricant, and 0.1 to 20 parts by weight of the dye, based on 100 parts by weight of a poly(alkylene carbonate) resin.

The eco-friendly poly(alkylene carbonate) resin composition for the transparent hard tarpaulin includes 2 to 50 parts by weight of the strength controller, 0.1 to 30 parts by weight of the impact modifier, 0.1 to 5 parts by weight of the lubricant, and 0.1 to 20 parts by weight of the dye, based on 100 parts by weight of a poly(alkylene carbonate) resin.

The eco-friendly poly(alkylene carbonate) resin composition for the opaque hard tarpaulin includes 2 to 50 parts by weight of the strength controller, 0.1 to 30 parts by weight of the impact modifier, 0.1 to 200 parts by weight of the filler, 0.1 to 5 parts by weight of the lubricant, and 0.1 to 20 parts by weight of the dye, based on 100 parts by weight of a poly(alkylene carbonate) resin.

In another general aspect, an eco-friendly poly(alkylene carbonate) resin composition for a packaging wrap includes at least one selected from the group consisting of 0.1 to 30 parts by weight of an strength controller, 2 to 80 parts by weight of a flexibilizer, 0.1 to 5 parts by weight of a flameproofing agent, and 0.1 to 30 parts by weight of a lubricant, based on 100 parts by weight of a poly(alkylene carbonate) resin.

A poly(alkylene carbonate) resin (Green Pol) in the eco-friendly poly(alkylene carbonate) resin composition is distinctly differentiated from the common plastics in view of adhesive property, elongation (stretching property), transparency, and oxygen and moisture barrier property, due to structural distinctiveness thereof.

In another general aspect, an eco-friendly poly(alkylene carbonate) resin composition for wall paper includes at least one selected from the group consisting of 2 to 100 parts by weight of a flexibilizer, 30 to 300 parts by weight of a filler, 30 to 300 parts by weight of a flame retardant agent or a flameproofing agent, 5 to 30 parts by weight of a obliterating power improver, 0.5 to 10 parts by weight of a foaming agent, and 0.1 to 10 parts by weight of a lubricant, based on 100 parts by weight of a poly(alkylene carbonate) resin.

Here, the eco-friendly poly(alkylene carbonate) resin composition for wall paper may be used as a foaming wall paper or a flameproofing (flame retardant) wall paper, by combination with the flexibilizer, the filler, the flame retardant agent or the flameproofing agent, the obliterating power improver, the foaming agent, or the lubricant.

A poly(alkylene carbonate) resin (Green Pol) in the eco-friendly poly(alkylene carbonate) resin composition is excellent in printability, tensile strength, elongation (stretching property), due to structural distinctiveness of itself and good miscibility with processing additives, and is excellent in foaming property, cost reduction, embossing property, acquisition of environment mark certification (due to excellent smoke density), and flameproofing property, due to good miscibility with the filler (calcium carbonate).

The eco-friendly poly(alkylene carbonate) resin composition for the foaming wall paper includes 2 to 100 parts by weight of the flexibilizer, 30 to 300 parts by weight of the filler, 5 to 30 parts by weight of the obliterating power improver, 0.5 to 10 parts by weight of the foaming agent, and 0.1 to 10 parts by weight of the lubricant, based on 100 parts by weight of a poly(alkylene carbonate) resin.

The eco-friendly poly(alkylene carbonate) resin composition for the flameproofing (flame retardant) wall paper includes 2 to 100 parts by weight of the flexibilizer, 30 to 300 parts by weight of the filler, 30 to 300 parts by weight of the flame retardant agent or the flameproofing agent, 5 to 30 parts by weight of the obliterating power improver, 0.5 to 10 parts by weight of the foaming agent, and 0.1 to 10 parts by weight of the lubricant, based on 100 parts by weight of a poly(alkylene carbonate) resin.

In another general aspect, an eco-friendly poly(alkylene carbonate) resin composition for an artificial leather includes at least one selected from the group consisting of 2 to 100 parts by weight of a flexibilizer, 0.5 to 50 parts by weight of an elasticity provider, 30 to 300 parts by weight of a filler, 0.5 to 30 parts by weight of a foaming agent, 30 to 300 parts by weight of a flame retardant agent or a flameproofing agent, 5 to 30 parts by weight of a obliterating power improver, 0.1 to 20 parts by weight of a dye, and 0.1 to 10 parts by weight of a lubricant, based on 100 parts by weight of a poly(alkylene carbonate) resin.

Here, the eco-friendly poly(alkylene carbonate) resin composition for an artificial leather may be used as a foaming or nonfoaming artificial leather or a flameproofing foaming or nonfoaming artificial leather, by combination with the flexibilizer, the elasticity provider, the filler, the foaming agent, the flame retardant agent or the flameproofing agent, the obliterating power improver, the dye, or the lubricant.

A poly(alkylene carbonate) resin (Green Pol) in the eco-friendly poly(alkylene carbonate) resin composition is excellent in printability, tensile strength, elongation (stretching property), due to structural distinctiveness of itself and excellent miscibility with processing additives. In addition, the poly(alkylene carbonate) resin (GreenPol) has advantages in that the hardness thereof can be easily regulated even with a small amount of the flexibilizer developed by SK Energy Company and scheduled to be filed as a patent application, and environment mark certification can be acquired due to excellent smoke density.

The eco-friendly poly(alkylene carbonate) resin composition for the foaming artificial leather includes 2 to 100 parts by weight of the flexibilizer, 0.5 to 50 parts by weight of the elasticity provider, 30 to 300 parts by weight of the filler, 0.5 to 30 parts by weight of the foaming agent, 30 to 300 parts by weight of the flame retardant agent or the flameproofing agent, 5 to 30 parts by weight of the obliterating power improver, 0.1 to 20 parts by weight of the dye, and 0.1 to 10 parts by weight of the lubricant, based on 100 parts by weight of the poly(alkylene carbonate) resin.

The eco-friendly poly(alkylene carbonate) resin composition for the nonfoaming artificial leather includes 2 to 100 parts by weight of the flexibilizer, 0.5 to 50 parts by weight of the elasticity provider, 30 to 300 parts by weight of the filler, 0.5 to 30 parts by weight of the foaming agent, 30 to 300 parts by weight of the flame retardant agent or the flameproofing agent, 5 to 30 parts by weight of the obliterating power improver, 0.1 to 20 parts by weight of the dye, and 0.1 to 10 parts by weight of the lubricant, based on 100 parts by weight of the poly(alkylene carbonate) resin.

The eco-friendly poly(alkylene carbonate) resin composition for the flameproofing foaming artificial leather includes 2 to 100 parts by weight of the flexibilizer, 0.5 to 50 parts by weight of the elasticity provider, 30 to 300 parts by weight of the filler, 0.5 to 30 parts by weight of the foaming agent, 30 to 300 parts by weight of the flame retardant agent or the flameproofing agent, 5 to 30 parts by weight of the obliterating power improver, 0.1 to 20 parts by weight of the dye, and 0.1 to 10 parts by weight of the lubricant, based on 100 parts by weight of the poly(alkylene carbonate) resin.

The eco-friendly poly(alkylene carbonate) resin composition for the flameproofing nonfoaming artificial leather includes 2 to 100 parts by weight of the flexibilizer, 0.5 to 50 parts by weight of the elasticity provider, 30 to 300 parts by weight of the filler, 0.5 to 30 parts by weight of the foaming agent, 30 to 300 parts by weight of the flame retardant agent or the flameproofing agent, 5 to 30 parts by weight of the obliterating power improver, 0.1 to 20 parts by weight of the dye, and 0.1 to 10 parts by weight of the lubricant, based on 100 parts by weight of the poly(alkylene carbonate) resin.

The above-mentioned eco-friendly poly(alkylene carbonate) resin composition may be prepared by an extrusion method as well as a calender method. The calender method exhibits excellence in view of productivity by four to five times as compared with the extrusion method of the related art, and can be performed at a lower temperature. The eco-friendly poly(alkylene carbonate) resin composition has lower specific gravity than polyvinyl chloride resin based materials, thereby reducing the manufacturing costs.

In addition, the eco-friendly poly(alkylene carbonate) resin composition has excellent elongation, as compared with polypropylene (PP) and polyethylene terephthalate glycol (PET-G), which are alternatives for the polyvinyl chloride resin. The above elongation is improved by three to four times as compared with that of the polyvinyl chloride resin. The eco-friendly poly(alkylene carbonate) resin composition for the decorative sheet according to the present invention exhibits very favorable physical properties in a process where it is stretched and attached on wooden materials or iron plates, and the process can be performed at a low temperature, such as room temperature to 50° C. This enables the eco-friendly poly(alkylene carbonate) resin composition for the packaging wrap to have appropriate elongation (stretching property).

In addition, when the eco-friendly poly(alkylene carbonate) resin composition for the packaging wrap or the wall paper is applied for use in foaming, it exhibits very excellent tensile strength and elongation, and it is excellent in improvement of durability and easiness of post processing.

DETAILED DESCRIPTION OF EMBODIMENTS

Hereinafter, the present invention will be described in detail by examples.

The following examples are for merely exemplifying the present invention, and therefore, the scope of the present invention is not limited to the following examples.

(Evaluation on Physical Property)

1. Tensile strength/Elongation was measured according to ASTM D638.

2. Tear strength was measured according to ASTM D1004.

3. Smoke density was measured according to ASTM E662.

4. Dimensional stability: Each sheet specimen (200×20 mm) was kept within a dry oven at 80° C. for one week, and then it was measured whether length variations thereof are within ±4%.

5. Cold resistant property: Five sheet specimens (150×20 mm) were kept within a chamber at −30° C. for 4 hours, and then evaluation was performed on the sheet specimens by Folding test (After each specimen installed at the catching unit was folded and then unfolded, a degree at which the specimen is split or broken was evaluated.)

(Evaluation: Fail when Two or More Specimens are Broken)

6. Whiteness index: Whiteness index was measured by a color meter.

7. Calender processability and workability: blendability/compoundability, processing temperature, Roll workability, and a degree at which molten materials are stained on a roll, were measured.

(Evaluation: 1. very inferior, 2. inferior, 3. good, 4. excellent, 5. most excellent)

8. Post processing workability: Workability about printing, embossing, laminating, or surface treatment, was measured.

(Evaluation: 1. very inferior, 2. inferior, 3. good, 4. excellent, 5. most excellent)

9. Transparency was measured by using a haze meter.

Example 1

100 parts by weight of a poly(propylene carbonate) resin (Green Pol, SK Energy Company), 5 parts by weight of an strength controller and dimensional stabilizer (PA828, LG Chemistry), 5 parts by weight of a flexibilizer (DAIFATTY-101, Japan), 15 parts by weight of a obliterating power improver (KA100, Cosmo Chemistry), and 2 parts by weight of a lubricant (stearic acid, and dioctylterephthalate by Eastman Company in USA) were put in a Henschel mixer, and then dry blended for 20 minutes. The dry blended mixture was put into a compounding extruder at 140° C. to be pelletized. This was prepared into a sheet semi-finished product through a compounding process (mixing rolls and warming rolls) and a calender process, followed by print, primer, and surface treatment processes, thereby producing a decorative sheet finished product.

Physical properties of the produced opaque soft eco-friendly poly(propylene carbonate) decorative sheet product were measured, and then tabulated in to Table 1.

Example 2

A product was produced by performing the same method as Example 1 except that the flexibilizer was not used, and physical property results thereof were tabulated in Table. 1

TABLE 1

| Physical Property | Example 1 | Example 2 | Polyvinyl chloride (for membrane) |
|---|---|---|---|
| Tensile strength (kgf/mm$^2$) | 4.5~5.0 | 6.0~6.4 | 1.9~2.0 |
| Elongation (%) | 570~650 | 400~450 | 200~300 |
| Tear Strength (kgf/mm) | 2.0~2.3 | 3.6~4.0 | 0.8~1.1 |
| Printability | Most excellent | Most excellent | Excellent |
| Flameproofing Property (Smoke Density) | 1~10 | 1~10 | 1000~1100 |

Example 3

100 parts by weight of a poly(propylene carbonate) resin (Green Pol, SK Energy Company), 5 parts by weight of an strength controller and 1 parts by weight of a lubricant (dioctylterephthalate by Eastman Company in USA) were put in a Henschel mixer, and then dry blended for 20 minutes. The dry blended mixture was put into a compounding extruder at 140° C. to be pelletized. This was prepared into a sheet semi-finished product through a compounding process (mixing rolls and warming rolls) and a calender process, and then adhered to a glass fiber, followed by print, primer, and surface treatment processes, thereby producing a decorative sheet finished product.

Physical properties of the produced transparent hard eco-friendly poly(propylene carbonate) interior sheet product were measured, and then tabulated in Table 2.

Example 4

A product was produced by performing the same method as Example 3 except that an impact modifier was not used and 20 parts by weight of a flexibilizer was used, and physical property results thereof were tabulated in Table. 2

TABLE 2

| Physical Property | Example 3 | Example 4 | polyvinyl chloride (Plasticizer Content, 60 parts by weight) |
|---|---|---|---|
| Hardness (Shore A) | 90~96 | 40~45 | 50~60 |
| Transparency (Opacity) | <3 | <3 | <5 |
| Flameproofing Property (Smoke Density) | 1~10 | 1~10 | 1000~1300 |
| Environment Mark Certification | Possible | Possible | Impossible |

Example 5

100 parts by weight of a poly(propylene carbonate) resin (Green Pol, SK Energy Company), 150 parts by weight of a filler (Omya-10, Omya Korea Company), 15 parts by weight of a obliteraring power improver (KA100, Cosmo Chemistry), 20 parts by weight of a flexibilizer (DAIFATTY-101, Japan), 3 weight of a foaming agent (AC1000, KumYang Company), and 2 parts by weight of a lubricant (stearic acid, and dioctylterephthalate) were put in a Henschel mixer, and then dry blended for 30 to 40 minutes. The dry blended mixture was put into a compounding extruder at 110° C. to be sheeted. This was prepared into a foaming sheet semi-finished product through a compounding process (mixing rolls and warming rolls) and a calender process, and then was adhered to a raw paper, followed by foaming, printing, and embossing processes, thereby producing a finished product.

Physical properties of the produced eco-friendly poly(propylene carbonate) wall paper product were measured, and then tabulated in Table 3.

Example 6

100 parts by weight of a poly(propylene carbonate) resin (Green Pol, SK Energy Company), 120 parts by weight of a filler (Omya-5T, Omya Korea Company), 5 parts by weight of an elasticity provider (Soarblen, Uni trading corporation), 20 parts by weight of a flexibilizer (DAIFATTY-101, Japan), 3 weight of a foaming agent (AC3000, KumYang Company), and 2 parts by weight of a lubricant (stearic acid, and dioctylterephthalate) were put in a Henschel mixer, and then dry blended for 30 to 40 minutes. The dry blended mixture was put into a compounding extruder at 110° C. to be sheeted. This was prepared into a foaming sheet semi-finished product through a compounding process (mixing rolls and warming rolls) and a calender process, and then was adhered to a raw fabric, followed by foaming, printing, embossing, and surface treatment processes, thereby producing a finished product.

Physical properties of the produced eco-friendly poly(propylene carbonate) artificial leather product were measured, and then tabulated in Table 3.

TABLE 3

| Physical Property | Example 5 | polyvinyl chloride (Wall Paper) | Example 6 | polyvinyl chloride (Artificial Leather) |
|---|---|---|---|---|
| Foaming Physical Property (Cell state/Magnification) | Opened cell (Irregular sphere), <2 times | Opened cell (Irregular sphere), <2 times | Closed cell (≧Fine sphere), 2.5 to 3 times | Closed cell (≧Fine sphere), 2.5 to 3 times |
| Elongation(%) | <100 | <10 | 100~130 | <30 |
| Flameproofing Property (Smoke Density) | 1~10 | 1000~1100 | 1~10 | 1000~1200 |
| Environment Mark Certification | Possible | Impossible | Possible | Impossible |

Example 7

100 parts by weight of a poly(propylene carbonate) resin (SK Innovation Company), 5 parts by weight of an strength controller (LLDPE, SK Company), 5 parts by weight of a flexibilizer (DAIFATTY-101, DAIHACHI Company in Japan), 7.5 parts by weight of a obliterating power improver (KA100, Cosmo Chemistry), 0.1 parts by weight of a compatibilizer (EM200, Honam Petrochemical Company), 20 parts by weight of a filler (Omya-2T, Omya Korea), and 1 part by weight of a lubricant (stearic acid, OCI) were put in a Henschel mixer, and then dry blended for 20 minutes. The dry blended mixture was put into a compounding extruder at 150° C. to be pelletized. This was prepared into a sheet semi-finished product through a compounding process (mixing rolls and warming rolls) and a calender process, followed by print, primer, and surface treatment processes, and a laminating process, thereby producing a decorative sheet finished product.

Examples 8 to 18 and Comparative Examples 1 and 2

Examples 8 to 12 were performed by the same method as Example 1 except that the strength controller was controlled in 10, 20, 50, 75, and 100 parts by weight for the examples, respectively. Examples 13 to 18 were performed by the same method as Example 7 except that SKflex by SK Innovation Company was used as the flexibilizer and controlled in 1, 2.5, 5, 10, 20, and 50 parts by weight for the examples, respectively. Comparative examples 1 and 2 were performed by the same method as Example 7 except that the strength controller and the flexibilizer were not used, respectively.

TABLE 4

| | Example | | | | | | | | | | | | Comparative example 1 | Comparative example 2 |
|---|---|---|---|---|---|---|---|---|---|---|---|---|---|---|
| | 7 | 8 | 9 | 10 | 11 | 12 | 13 | 14 | 15 | 16 | 17 | 18 | | |
| Tensile strength (kgf/mm$^2$) | 110 | 140 | 155 | 180 | 220 | 250 | 195 | 182 | 165 | 150 | 132 | 100 | 30 | 210 |
| Tear Strength (kgf/cm$^2$) | 45 | 60 | 70 | 95 | 110 | 130 | 94 | 87 | 80 | 68 | 60 | 52 | 12 | 105 |
| Elongation (%) | 700 | 680 | 530 | 480 | 350 | 300 | 420 | 490 | 540 | 620 | 750 | >800 | >800 | 330 |
| Dimensional Stability (±4%, 80° C.) | ○ | ○ | ○ | ○ | ○ | ○ | ○ | ○ | ○ | ○ | ○ | ○ | X | ○ |
| Cold Resistant Property (−30° C.) | ○ | ○ | ○ | ○ | ○ | ○ | ○ | ○ | ○ | ○ | ○ | ○ | X | ○ |
| Calender Processability & Workability | 3 | 4 | 4 | 4 | 5 | 5 | 4 | 4 | 4 | 4 | 4 | 3 | 2 | 4 |
| Post Processing Workability | 3 | 4 | 4 | 4 | 4 | 4 | 4 | 4 | 4 | 4 | 4 | 4 | 2 | 4 |
| Smoke Density | 30 | 33 | 35 | 40 | 50 | 60 | <30 | <30 | <30 | <30 | <30 | <30 | <20 | 33 |

Examples 19 to 30

Examples 19 to 24 were performed by the same methods as Examples 13 to 18, respectively, except that DAIFATTY-101 by DAIHACHI Company was used as the flexibilizer. Examples 25 to 30 were performed by the same methods as Examples 13 to 18, respectively, except that acrylate (PA828, LG Chemical) was used as the flexibilizer.

TABLE 5

| | Example | | | | | | | | | | | |
|---|---|---|---|---|---|---|---|---|---|---|---|---|
| | 19 | 20 | 21 | 22 | 23 | 24 | 25 | 26 | 27 | 28 | 29 | 30 |
| Tensile strength (kgf/cm$^2$) | 190 | 176 | 155 | 144 | 120 | 95 | 184 | 170 | 148 | 135 | 114 | 93 |
| Tear Strength (kgf/cm$^2$) | 82 | 75 | 70 | 57 | 53 | 45 | 79 | 72 | 65 | 52 | 45 | 39 |
| Elongation (%) | 450 | 500 | 530 | 650 | >800 | >800 | 440 | 490 | 540 | 640 | >800 | >800 |

TABLE 5-continued

| | Example | | | | | | | | | | | |
|---|---|---|---|---|---|---|---|---|---|---|---|---|
| | 19 | 20 | 21 | 22 | 23 | 24 | 25 | 26 | 27 | 28 | 29 | 30 |
| Dimensional Stability (±4%, 80° C.) | ○ | ○ | ○ | ○ | ○ | ○ | ○ | ○ | ○ | ○ | ○ | ○ |
| Cold Resistant Property (−30° C.) | ○ | ○ | ○ | ○ | ○ | ○ | ○ | ○ | ○ | ○ | ○ | ○ |
| Calender Processability& Workability | 4 | 4 | 4 | 4 | 4 | 3 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <35 | <35 | <35 | <35 | <35 | <35 | <35 | <35 | <35 | <35 | <35 | <35 |

Examples 31 to 46

Examples 31 to 46 were performed by the same method as Example 7, except that TU100D by Honam Petrochemical Company was used as the compatibilizer and controlled in 0.1, 0.5, 1, and 5 parts by weight for Examples 31 to 34, respectively; BP402 by Honam Petrochemical Company was used as the compatibilizer and controlled in 0.1, 0.5, 1, and 5 parts by weight for Examples 35 to 38, respectively; EV600 by Honam Petrochemical Company was used as the compatibilizer and controlled in 0.1, 0.5, 1, and 5 parts by weight for Examples 39 to 42, respectively; and EM200 by Honam Petrochemical Company was used as the compatibilizer and controlled in 0.1, 0.5, 1, and 5 parts by weight for Examples 43 to 46, respectively. Comparative example 3 was performed by the same method as Example 7 except that the compatibilizer was not used.

TABLE 6

| | Example | | | | | | | | | | | | | | | | Comparative example 3 |
|---|---|---|---|---|---|---|---|---|---|---|---|---|---|---|---|---|---|
| | 31 | 32 | 33 | 34 | 35 | 36 | 37 | 38 | 39 | 40 | 41 | 42 | 43 | 44 | 45 | 46 | |
| Tensile strength (kgf/cm$^2$) | 152 | 170 | 200 | 225 | 145 | 167 | 190 | 210 | 154 | 173 | 205 | 227 | 155 | 173 | 210 | 230 | 135 |
| Tear Strength (kgf/cm$^2$) | 68 | 80 | 95 | 110 | 64 | 77 | 92 | 106 | 68 | 83 | 95 | 110 | 70 | 83 | 98 | 115 | 52 |
| Elongation (%) | 540 | 640 | 650 | 750 | 550 | 640 | 670 | 750 | 540 | 630 | 700 | >800 | 530 | 630 | 670 | 750 | 460 |
| Dimensional Stability (±4%, 80° C.) | ○ | ○ | ○ | ○ | ○ | ○ | ○ | ○ | ○ | ○ | ○ | ○ | ○ | ○ | ○ | ○ | ○ |
| Cold Resistant Property (−30° C.) | ○ | ○ | ○ | ○ | ○ | ○ | ○ | ○ | ○ | ○ | ○ | ○ | ○ | ○ | ○ | ○ | ○ |
| Calender Processability &Workability | 4 | 4 | 4 | 4 | 4 | 4 | 4 | 4 | 4 | 4 | 4 | 4 | 4 | 4 | 4 | 4 | 4 |
| Post Processing Workability | 4 | 4 | 4 | 4 | 4 | 4 | 4 | 4 | 4 | 4 | 4 | 4 | 4 | 4 | 4 | 4 | 4 |
| Smoke Density | <35 | <35 | <35 | <35 | <35 | <35 | <35 | <35 | <35 | <35 | <35 | <35 | <35 | <35 | <35 | <35 | <35 |

Examples 47 to 58

Examples 47 to 58 were performed by the same method as Example 7, except that Omya-2 by Omya Korea Company was used as the filler and controlled in 20, 50, 100, and 200 parts by weight for Examples 47 to 50, respectively; Omya-2T by Omya Korea Company was used as the filler and controlled in 20, 50, 100, and 200 parts by weight for Examples 51 to 54, respectively; and Omya-5 by Omya Korea Company was used as the filler and controlled in 20, 50, 100, and 200 parts by weight for Examples 55 to 58, respectively. Comparative example 4 was performed by the same method as Example 7 except that the compatibilizer was not used.

TABLE 7

| | Example | | | | | | | | | | | | Comparative example 4 |
|---|---|---|---|---|---|---|---|---|---|---|---|---|---|
| | 47 | 48 | 49 | 50 | 51 | 52 | 53 | 54 | 55 | 56 | 57 | 58 | |
| Tensile strength (kgf/cm$^2$) | 160 | 152 | 105 | 55 | 155 | 148 | 90 | 50 | 154 | 144 | 92 | 60 | 190 |
| Tear Strength (kgf/cm$^2$) | 72 | 70 | 55 | 30 | 70 | 67 | 50 | 26 | 68 | 66 | 50 | 28 | 88 |
| Elongation (%) | 500 | 580 | 640 | 700 | 530 | 600 | 650 | 730 | 530 | 600 | 650 | 700 | 330 |
| Dimensional Stability (±4%, 80° C.) | ◯ | ◯ | ◯ | X | ◯ | ◯ | ◯ | X | ◯ | ◯ | ◯ | X | ◯ |
| Cold Resistant Property (−30° C.) | ◯ | ◯ | ◯ | X | ◯ | ◯ | ◯ | X | ◯ | ◯ | ◯ | X | ◯ |
| Calender Processability & Workability | 4 | 5 | 5 | 5 | 4 | 5 | 5 | 5 | 4 | 5 | 5 | 5 | 4 |
| Post Processing Workability | 4 | 4 | 4 | 4 | 4 | 4 | 4 | 4 | 4 | 4 | 4 | 4 | 4 |
| Smoke Density | <35 | <30 | <30 | <30 | <35 | <30 | <30 | <30 | <35 | <30 | <30 | <30 | <35 |

Examples 59 to 70

Examples 59 to 62 were performed by the same methods as Examples 47 to 50, respectively, except that Omya-5T by Omya Korea Company was used as the filler; Examples 63 to 66 were performed by the same methods as Examples 47 to 50, respectively, except that Omya-10 by Omya Korea Company was used as the filler; and Examples 67 to 70 were performed by the same methods as Examples 47 to 50, respectively, except that Omya-10T by Omya Korea Company was used as the filler.

TABLE 8

| | Example | | | | | | | | | | | |
|---|---|---|---|---|---|---|---|---|---|---|---|---|
| | 59 | 60 | 61 | 62 | 63 | 64 | 65 | 66 | 67 | 68 | 69 | 70 |
| Tensile strength (kgf/cm$^2$) | 152 | 140 | 88 | 54 | 144 | 120 | 84 | 41 | 140 | 118 | 76 | 40 |
| Tear Strength (kgf/cm$^2$) | 69 | 60 | 46 | 26 | 61 | 50 | 39 | 26 | 60 | 48 | 37 | 26 |
| Elongation (%) | 550 | 630 | 680 | 740 | 430 | 510 | 580 | 650 | 450 | 530 | 610 | 670 |
| Dimensional Stability (±4%, 80° C.) | ◯ | ◯ | ◯ | X | ◯ | ◯ | ◯ | X | ◯ | ◯ | ◯ | X |
| Cold Resistant Property (−30° C.) | ◯ | ◯ | ◯ | X | ◯ | ◯ | ◯ | X | ◯ | ◯ | ◯ | X |
| Calender Processability & Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <35 | <30 | <30 | <30 | <35 | <30 | <30 | <30 | <35 | <30 | <30 | <30 |

Examples 71 to 80 and Comparative Examples 5 and 6

Examples 71 to 80 were performed by the same method as Example 7, except that the obliterating power improver was controlled in 5, 7.5, 10, 20, and 30 parts by weight for Examples 71 to 75, respectively; and the lubricant was controlled in 0.1, 0.5, 1, 2, and 5 parts by weight for Examples 76 to 80, respectively. Comparative examples 5 and 6 were performed by the same method as Example 7 except that the obliterating power improver and the lubricant were not used for the comparative examples, respectively.

TABLE 9

| | Comparative example 5 | Example 71 | Example 72 | Example 73 | Example 74 | Example 75 |
|---|---|---|---|---|---|---|
| Whiteness | 40 | 60 | >80 | >80 | >80 | >80 |

TABLE 10

| | Comparative example 6 | Example 76 | Example 77 | Example 78 | Example 79 | Example 80 |
|---|---|---|---|---|---|---|
| Calender Processability&Workability | 2 | 4 | 4 | 4 | 4 | 2 |
| Post Processing Workability | 2 | 4 | 4 | 4 | 4 | 2 |

Example 81

Example 81 was performed by the same method as Example 7 except that Random Polypropylene by SK Innovation Company was used as the strength controller.

Examples 82 to 92

Examples 82 to 92 were performed by the same method as Example 81, except that the strength controller was controlled in 10, 20, 50, 75, and 100 parts by weight for Examples 82 to 86, respectively; and SKflex by SK Innovation Company was used as the flexibilizer and controlled in 1, 2.5, 5, 10, 20, and 50 parts by weight for Examples 87 to 92, respectively.

TABLE 11

| | 81 | 82 | 83 | 84 | 85 | 86 | 87 | 88 | 89 | 90 | 91 | 92 |
|---|---|---|---|---|---|---|---|---|---|---|---|---|
| Tensile strength (kgf/cm$^2$) | 115 | 155 | 180 | 205 | 234 | 265 | 230 | 205 | 196 | 172 | 152 | 122 |
| Tear Strength (kgf/cm$^2$) | 47 | 70 | 85 | 97 | 119 | 132 | 112 | 98 | 86 | 77 | 68 | 57 |
| Elongation (%) | 680 | 620 | 530 | 420 | 330 | 270 | 400 | 490 | 550 | 680 | >800 | >800 |
| Dimensional Stability (±4%, 80° C.) | ○ | ○ | ○ | ○ | ○ | X | ○ | ○ | ○ | ○ | ○ | ○ |
| Cold Resistant Property (−30° C.) | ○ | ○ | ○ | ○ | ○ | X | ○ | ○ | ○ | ○ | ○ | ○ |
| Calender Processability&Workability | 3 | 4 | 4 | 4 | 5 | 5 | 4 | 4 | 4 | 4 | 4 | 3 |
| Post Processing Workability | 3 | 4 | 4 | 4 | 4 | 4 | 4 | 4 | 4 | 4 | 4 | 4 |
| Smoke Density | 30 | 33 | 35 | 40 | 50 | 60 | <30 | <30 | <30 | <30 | <30 | <30 |

Examples 93 to 104

Examples 93 to 98 were performed by the same methods as Examples 87 to 92, respectively, except that DAIFATTY-101 by DAIHACHI Company was used as the flexibilizer. Examples 99 to 104 were performed by the same methods as Examples 87 to 92, respectively, except that acrylate (PA828, LG Chemical) was used as the flexibilizer.

TABLE 12

| | 93 | 94 | 95 | 96 | 97 | 98 | 99 | 100 | 101 | 102 | 103 | 104 |
|---|---|---|---|---|---|---|---|---|---|---|---|---|
| Tensile strength (kgf/cm$^2$) | 200 | 186 | 180 | 164 | 142 | 110 | 210 | 196 | 185 | 171 | 150 | 118 |
| Tear Strength (kgf/cm$^2$) | 97 | 90 | 85 | 78 | 68 | 55 | 107 | 97 | 87 | 80 | 70 | 56 |
| Elongation (%) | 400 | 470 | 530 | 660 | >800 | >800 | 410 | 490 | 570 | 700 | >800 | >800 |

TABLE 12-continued

| | Example | | | | | | | | | | | |
|---|---|---|---|---|---|---|---|---|---|---|---|---|
| | 93 | 94 | 95 | 96 | 97 | 98 | 99 | 100 | 101 | 102 | 103 | 104 |
| Dimensional Stability (±4%, 80° C.) | ○ | ○ | ○ | ○ | ○ | ○ | ○ | ○ | ○ | ○ | ○ | ○ |
| Cold Resistant Property (−30° C.) | ○ | ○ | ○ | ○ | ○ | ○ | ○ | ○ | ○ | ○ | ○ | ○ |
| Calender Processability&Workability | 4 | 4 | 4 | 4 | 4 | 3 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <35 | <35 | <35 | <35 | <35 | <35 | <35 | <35 | <35 | <35 | <35 | <35 |

Examples 105 to 120

Examples 105 to 120 were performed by the same method as Example 81, except that TU100D by Honam Petrochemical Company was used as the compatibilizer and controlled in 0.1, 0.5, 1, and 5 parts by weight for Examples 105 to 108, respectively; BP402 by Honam Petrochemical Company was used as the compatibilizer and controlled in 0.1, 0.5, 1, and 5 parts by weight for Examples 109 to 112, respectively; EV600 by Honam Petrochemical Company was used as the compatibilizer and controlled in 0.1, 0.5, 1, and 5 parts by weight for Examples 113 to 116, respectively; and EM200 by Honam Petrochemical Company was used as the compatibilizer and controlled in 0.1, 0.5, 1, and 5 parts by weight for Examples 117 to 120, respectively.

TABLE 13

| | Example | | | | | | | | | | | | | | | |
|---|---|---|---|---|---|---|---|---|---|---|---|---|---|---|---|---|
| | 105 | 106 | 107 | 108 | 109 | 110 | 111 | 112 | 113 | 114 | 115 | 116 | 117 | 118 | 119 | 120 |
| Tensile strength (kgf/cm$^2$) | 173 | 190 | 206 | 218 | 180 | 197 | 210 | 228 | 174 | 192 | 208 | 215 | 177 | 195 | 209 | 224 |
| Tear Strength (kgf/cm$^2$) | 80 | 91 | 100 | 112 | 85 | 98 | 107 | 115 | 80 | 93 | 99 | 112 | 88 | 95 | 107 | 112 |
| Elongation (%) | 460 | 530 | 620 | 690 | 480 | 540 | 620 | 700 | 500 | 590 | 670 | 750 | 490 | 550 | 640 | 730 |
| Dimensional Stability (±4%, 80° C.) | ○ | ○ | ○ | ○ | ○ | ○ | ○ | ○ | ○ | ○ | ○ | ○ | ○ | ○ | ○ | ○ |
| Cold Resistant Property (−30° C.) | ○ | ○ | ○ | ○ | ○ | ○ | ○ | ○ | ○ | ○ | ○ | ○ | ○ | ○ | ○ | ○ |
| Calender Processability&Workability | 4 | 4 | 4 | 4 | 4 | 4 | 4 | 4 | 4 | 4 | 4 | 4 | 4 | 4 | 4 | 4 |
| Post Processing Workability | 4 | 4 | 4 | 4 | 4 | 4 | 4 | 4 | 4 | 4 | 4 | 4 | 4 | 4 | 4 | 4 |
| Smoke Density | <35 | <35 | <35 | <35 | <35 | <35 | <35 | <35 | <35 | <35 | <35 | <35 | <35 | <35 | <35 | <35 |

Examples 121 to 132

Examples 121 to 132 were performed by the same method as Example 81, except that Omya-2 by Omya Korea Company was used as the filler and controlled in 20, 50, 100, and 200 parts by weight for Examples 121 to 124, respectively; Omya-2T by Omya Korea Company was used as the filler and controlled in 20, 50, 100, and 200 parts by weight for Examples 125 to 128, respectively; and Omya-5 by Omya Korea Company was used as the filler and controlled in 20, 50, 100, and 200 parts by weight for Examples 129 to 132, respectively.

TABLE 14

| | Example | | | | | | | | | | | |
|---|---|---|---|---|---|---|---|---|---|---|---|---|
| | 121 | 122 | 123 | 124 | 125 | 126 | 127 | 128 | 129 | 130 | 131 | 132 |
| Tensile strength (kgf/cm$^2$) | 188 | 170 | 143 | 107 | 180 | 164 | 139 | 92 | 174 | 160 | 135 | 88 |
| Tear Strength (kgf/cm$^2$) | 87 | 80 | 68 | 52 | 85 | 77 | 64 | 48 | 77 | 69 | 60 | 46 |
| Elongation (%) | 520 | 580 | 640 | 690 | 530 | 620 | 650 | 680 | 520 | 580 | 610 | 660 |
| Dimensional Stability (±4%, 80° C.) | ○ | ○ | ○ | X | ○ | ○ | ○ | X | ○ | ○ | ○ | X |
| Cold Resistant Property (−30° C.) | ○ | ○ | ○ | X | ○ | ○ | ○ | X | ○ | ○ | ○ | X |
| Calender Processability&Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <35 | <30 | <30 | <30 | 35 | <30 | <30 | <30 | <35 | <30 | <30 | <30 |

Examples 133 to 144

Examples 133 to 136 were performed by the same methods as Examples 121 to 124, respectively, except that Omya-5T by Omya Korea Company was used as the filler; Examples 137 to 140 were performed by the same methods as Examples 121 to 124, respectively, except that Omya-10 by Omya Korea Company was used as the filler; and Examples 141 to 144 were performed by the same methods as Examples 121 to 124, respectively, except that Omya-10T by Omya Korea Company was used as the filler.

Examples 145 to 154

Examples 145 to 154 were performed by the same method as Example 81, except that the obliterating power improver was controlled in 5, 7.5, 10, 20, and 30 parts by weight for Examples 145 to 149, and the lubricant was controlled in 0.1, 0.5, 1, 2, and 5 parts by weight for Examples 150 to 154.

TABLE 15

| | Example | | | | | | | | | | | |
|---|---|---|---|---|---|---|---|---|---|---|---|---|
| | 133 | 134 | 135 | 136 | 137 | 138 | 139 | 140 | 141 | 142 | 143 | 144 |
| Tensile strength (kgf/cm$^2$) | 170 | 155 | 128 | 80 | 170 | 154 | 130 | 75 | 166 | 149 | 130 | 72 |
| Tear Strength (kgf/cm$^2$) | 73 | 63 | 58 | 38 | 73 | 60 | 52 | 38 | 70 | 59 | 50 | 35 |
| Elongation (%) | 540 | 600 | 650 | 700 | 500 | 550 | 600 | 660 | 520 | 590 | 620 | 680 |
| Dimensional Stability (±4%, 80° C.) | ○ | ○ | ○ | X | ○ | ○ | ○ | X | ○ | ○ | ○ | X |
| Cold Resistant Property (−30° C.) | ○ | ○ | ○ | X | ○ | ○ | ○ | X | ○ | ○ | ○ | X |
| Calender Processability&Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <35 | <30 | <30 | <30 | <35 | <30 | <30 | <30 | <35 | <30 | <30 | <30 |

TABLE 16

| Example | 145 | 146 | 147 | 148 | 149 |
|---|---|---|---|---|---|
| Whiteness | 60 | >80 | >80 | >80 | >80 |

TABLE 17

| Example | 150 | 151 | 152 | 153 | 154 |
|---|---|---|---|---|---|
| Calender Processability & Workability | 4 | 4 | 4 | 4 | 2 |
| Post Processing Workability | 4 | 4 | 4 | 4 | 2 |

Example 155

100 parts by weight of a poly(propylene carbonate) resin (SK Innovation Company), 5 parts by weight of an strength controller (polylactic acid, SK Innovation Company), 5 parts by weight of a flexibilizer (DAIFATTY-101, DAIHACHI Company in Japan), 7.5 parts by weight of a obliterating power improver (KA100, Cosmo Chemistry), 20 parts by weight of a filler (Omya-2T, Omya Korea Company), and 2 part by weight of a lubricant (stearic acid, OCI) were put in a Henschel mixer, and then dry blended for 20 minutes. The dry blended mixture was put into a compounding extruder at 160° C. to be pelletized. This was prepared into a sheet semi-finished product through a compounding process (mixing rolls and warming rolls) and a calender process, followed by print, primer, and surface treatment processes, and a laminating process, thereby producing a decorative sheet finished product.

Examples 156 to 166

Examples 156 to 166 were performed by the same method as Example 155, except that the strength controller was controlled in 10, 20, 50, 75, and 100 parts by weight for Examples 156 to 160, respectively; and SKflex by SK Innovation Company was used as the flexibilizer and controlled in 1, 2.5, 5, 10, 20, and 50 parts by weight for Examples 161 to 166, respectively.

TABLE 18

| | Example | | | | | | | | | | | |
|---|---|---|---|---|---|---|---|---|---|---|---|---|
| | 155 | 156 | 157 | 158 | 159 | 160 | 161 | 162 | 163 | 164 | 165 | 166 |
| Tensile strength (kgf/cm$^2$) | 110 | 140 | 155 | 180 | 220 | 255 | 200 | 192 | 172 | 158 | 130 | 110 |
| Tear Strength (kgf/cm$^2$) | 45 | 60 | 70 | 91 | 106 | 124 | 98 | 86 | 75 | 68 | 56 | 47 |
| Elongation (%) | 700 | 580 | 430 | 380 | 250 | 180 | 280 | 330 | 400 | 520 | 660 | 750 |
| Dimensional Stability (±4%, 80° C.) | ○ | ○ | ○ | ○ | ○ | X | ○ | ○ | ○ | ○ | ○ | ○ |
| Cold Resistant Property (−30° C.) | ○ | ○ | ○ | ○ | ○ | X | ○ | ○ | ○ | ○ | ○ | ○ |
| Calender Processability & Workability | 3 | 4 | 4 | 4 | 4 | 2 | 4 | 4 | 4 | 4 | 4 | 3 |
| Post Processing Workability | 3 | 4 | 4 | 4 | 4 | 4 | 4 | 4 | 4 | 4 | 4 | 4 |
| Smoke Density | <30 | <30 | <30 | <30 | <30 | <30 | <30 | <30 | <30 | <30 | <30 | <30 |

Examples 167 to 178

Examples 167 to 178 were performed by the same method as Example 155, except that DAIFATTY-101 by DAIHACHI Company was used as the flexibilizer and controlled in 1, 2.5, 5, 10, 20, and 50 for Examples 167 to 172, respectively; and acrylate (PA828, LG Company) was used as the flexibilizer and controlled in 1, 2.5, 5, 10, 20, and 50 for Examples 173 to 178, respectively.

TABLE 19

| | Example | | | | | | | | | | | |
|---|---|---|---|---|---|---|---|---|---|---|---|---|
| | 167 | 168 | 169 | 170 | 171 | 172 | 173 | 174 | 175 | 176 | 177 | 178 |
| Tensile strength (kgf/cm$^2$) | 194 | 177 | 155 | 134 | 118 | 102 | 202 | 188 | 170 | 158 | 134 | 112 |
| Tear Strength (kgf/cm$^2$) | 83 | 77 | 70 | 61 | 52 | 47 | 100 | 83 | 73 | 66 | 58 | 45 |
| Elongation (%) | 270 | 350 | 430 | 550 | 680 | >800 | 260 | 310 | 390 | 480 | 640 | 770 |
| Dimensional Stability (±4%, 80° C.) | ○ | ○ | ○ | ○ | ○ | ○ | ○ | ○ | ○ | ○ | ○ | ○ |
| Cold Resistant Property (−30° C.) | ○ | ○ | ○ | ○ | ○ | ○ | ○ | ○ | ○ | ○ | ○ | ○ |

TABLE 19-continued

| | Example | | | | | | | | | | | |
|---|---|---|---|---|---|---|---|---|---|---|---|---|
| | 167 | 168 | 169 | 170 | 171 | 172 | 173 | 174 | 175 | 176 | 177 | 178 |
| Calender Processability&Workability | 4 | 4 | 4 | 4 | 4 | 3 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <30 | <30 | <30 | <30 | <30 | <30 | <30 | <30 | <30 | <30 | <30 | <30 |

Examples 179 to 190

Examples 179 to 190 were performed by the same method as Example 81, except that Omya-2 by Omya Korea Company was used as the filler and controlled in 20, 50, 100, and 200 parts by weight for Examples 179 to 182, respectively; Omya-2T by Omya Korea Company was used as the filler and controlled in 20, 50, 100, and 200 parts by weight for Examples 183 to 186, respectively; and Omya-5 by Omya Korea Company was used as the filler and controlled in 20, 50, 100, and 200 parts by weight for Examples 187 to 190, respectively.

TABLE 20

| | Example | | | | | | | | | | | |
|---|---|---|---|---|---|---|---|---|---|---|---|---|
| | 179 | 180 | 181 | 182 | 183 | 184 | 185 | 186 | 187 | 188 | 189 | 190 |
| Tensile strength (kgf/cm$^2$) | 160 | 146 | 129 | 70 | 155 | 142 | 118 | 60 | 152 | 138 | 113 | 58 |
| Tear Strength (kgf/cm$^2$) | 76 | 66 | 58 | 35 | 70 | 62 | 55 | 32 | 69 | 60 | 51 | 30 |
| Elongation (%) | 480 | 550 | 620 | 710 | 530 | 590 | 660 | 750 | 490 | 560 | 650 | 730 |
| Dimensional Stability (±4%, 80° C.) | ○ | ○ | ○ | X | ○ | ○ | ○ | X | ○ | ○ | ○ | X |
| Cold Resistant Property (−30° C.) | ○ | ○ | ○ | X | ○ | ○ | ○ | X | ○ | ○ | ○ | X |
| Calender Processability&Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <30 | <30 | <30 | <30 | <30 | <30 | <30 | <30 | <30 | <30 | <30 | <30 |

Examples 191 to 202

Examples 191 to 194 were performed by the same methods as Examples 179 to 182, respectively, except that Omya-5T by Omya Korea Company was used as the filler; Examples 195 to 198 were performed by the same methods as Examples 179 to 182, respectively, except that Omya-10 by Omya Korea Company was used as the filler; and Examples 199 to 202 were performed by the same methods as Examples 179 to 182, respectively, except that Omya-10T by Omya Korea Company was used as the filler.

TABLE 21

| | Example | | | | | | | | | | | |
|---|---|---|---|---|---|---|---|---|---|---|---|---|
| | 191 | 192 | 193 | 194 | 195 | 196 | 197 | 198 | 199 | 200 | 201 | 202 |
| Tensile strength (kgf/cm$^2$) | 148 | 130 | 107 | 50 | 140 | 127 | 104 | 50 | 135 | 120 | 98 | 48 |
| Tear Strength (kgf/cm$^2$) | 66 | 58 | 47 | 23 | 59 | 51 | 45 | 22 | 55 | 46 | 40 | 22 |

TABLE 21-continued

| | Example | | | | | | | | | | | |
|---|---|---|---|---|---|---|---|---|---|---|---|---|
| | 191 | 192 | 193 | 194 | 195 | 196 | 197 | 198 | 199 | 200 | 201 | 202 |
| Elongation (%) | 500 | 550 | 660 | 740 | 410 | 530 | 620 | 700 | 430 | 530 | 650 | 750 |
| Dimensional Stability (±4%, 80° C.) | ○ | ○ | ○ | X | ○ | ○ | ○ | X | ○ | ○ | ○ | X |
| Cold Resistant Property (−30° C.) | ○ | ○ | ○ | X | ○ | ○ | ○ | X | ○ | ○ | ○ | X |
| Calender Processability&Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <30 | <30 | <30 | <30 | <30 | <30 | <30 | <30 | <30 | <30 | <30 | <30 |

Examples 203 to 212

Examples 203 to 212 were performed by the same method as Example 155, except that the obliterating power improver was controlled in 5, 7.5, 10, 20, and 30 parts by weight for Examples 203 to 207, and the lubricant was controlled in 0.1, 0.5, 1, 2, and 5 parts by weight for Examples 208 to 212.

TABLE 22

| Example | 203 | 204 | 205 | 206 | 207 |
|---|---|---|---|---|---|
| Whiteness | 60 | >80 | >80 | >80 | >80 |

TABLE 23

| Example | 208 | 209 | 210 | 211 | 212 |
|---|---|---|---|---|---|
| Calender Processability&Workability | 4 | 4 | 4 | 4 | 2 |
| Post Processing Workability | 4 | 4 | 4 | 4 | 2 |

Example 213

100 parts by weight of a poly(propylene carbonate) resin (SK Innovation Company), 5 parts by weight of pellet type modified polyester by BASF Company as an strength controller, 5 parts by weight of a flexibilizer (DAIFATTY-101, DAIHACHI Company in Japan), 7.5 parts by weight of a obliterating power improver (KA100, Cosmo Chemistry), 20 parts by weight of a filler (Omya-2T, Omya Korea), and 2 part by weight of a lubricant (stearic acid, OCI) were put in a Henschel mixer, and then dry blended for 20 minutes. The dry blended mixture was put into a compounding extruder at 120° C. to be pelletized. This was prepared into a sheet semi-finished product through a compounding process (mixing rolls and warming rolls) and a calender process, followed by print, primer, and surface treatment processes, and a laminating process, thereby producing a decorative sheet finished product.

Examples 214 to 224

Examples 214 to 218 were performed by the same method as Example 1, except that the strength controller was controlled in 10, 20, 50, 75, and 100 parts by weight, respectively, and Examples 219 to 224 were performed by the same method as Example 213, except that SKflex by SK Innovation Company was used as the flexibilizer and controlled in 1, 2.5, 5, 10, 20, and 50 parts by weight for Examples 219 to 224, respectively.

TABLE 24

| | Example | | | | | | | | | | | |
|---|---|---|---|---|---|---|---|---|---|---|---|---|
| | 213 | 214 | 215 | 216 | 217 | 218 | 219 | 220 | 221 | 222 | 223 | 224 |
| Tensile strength (kgf/cm²) | 137 | 148 | 160 | 182 | 207 | 230 | 218 | 195 | 177 | 163 | 151 | 120 |
| Tear Strength (kgf/cm²) | 65 | 71 | 77 | 89 | 103 | 117 | 107 | 95 | 83 | 71 | 63 | 54 |
| Elongation (%) | 700 | 610 | 500 | 440 | 380 | 290 | 430 | 480 | 560 | 670 | >800 | >800 |
| Dimensional Stability (±4%, 80° C.) | ○ | ○ | ○ | ○ | ○ | ○ | ○ | ○ | ○ | ○ | ○ | ○ |
| Cold Resistant Property (−30° C.) | ○ | ○ | ○ | ○ | ○ | ○ | ○ | ○ | ○ | ○ | ○ | ○ |
| Calender Processability&Workability | 4 | 4 | 4 | 4 | 4 | 4 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <20 | <20 | <20 | <20 | <20 | <20 | <20 | <20 | <20 | <20 | <20 | <20 |

Examples 225 to 236

Examples 225 to 230 were performed by the same method as Example 213, except that DAIFATTY-101 by DAIHACHI Company was used as the flexibilizer and controlled in 1, 2.5, 5, 10, 20, and 50 parts by weight, respectively, and Examples 231 to 236 were performed by the same method as Example 213 except that acrylate (PA828, LG Company) was used as the flexibilizer and controlled in 1, 2.5, 5, 10, 20, and 50 parts by weight, respectively.

TABLE 25

|  | Example | | | | | | | | | | | |
| --- | --- | --- | --- | --- | --- | --- | --- | --- | --- | --- | --- | --- |
|  | 225 | 226 | 227 | 228 | 229 | 230 | 231 | 232 | 233 | 234 | 235 | 236 |
| Tensile strength (kgf/cm$^2$) | 207 | 182 | 160 | 151 | 140 | 118 | 202 | 188 | 170 | 158 | 134 | 112 |
| Tear Strength (kgf/cm$^2$) | 105 | 89 | 77 | 69 | 58 | 51 | 100 | 83 | 73 | 66 | 58 | 45 |
| Elongation (%) | 420 | 450 | 500 | 620 | 750 | >800 | 260 | 310 | 390 | 480 | 640 | 770 |
| Dimensional Stability (±4%, 80° C.) | ○ | ○ | ○ | ○ | ○ | ○ | ○ | ○ | ○ | ○ | ○ | ○ |
| Cold Resistant Property (−30° C.) | ○ | ○ | ○ | ○ | ○ | ○ | ○ | ○ | ○ | ○ | ○ | ○ |
| Calender Processability&Workability | 4 | 4 | 4 | 4 | 4 | 3 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <20 | <20 | <20 | <20 | <20 | <20 | <30 | <30 | <30 | <30 | <30 | <30 |

Examples 237 to 248

Examples 237 to 248 were performed by the same method as Example 213, except that Omya-2 by Omya Korea Company was used as the filler and controlled in 20, 50, 100, and 200 parts by weight for Examples 237 to 240, respectively; Omya-2T by Omya Korea Company was used as the filler and controlled in 20, 50, 100, and 200 parts by weight for Examples 241 to 244, respectively; and Omya-5 by Omya Korea Company was used as the filler and controlled in 20, 50, 100, and 200 parts by weight for Examples 245 to 248, respectively.

TABLE 26

|  | Example | | | | | | | | | | | |
| --- | --- | --- | --- | --- | --- | --- | --- | --- | --- | --- | --- | --- |
|  | 237 | 238 | 239 | 240 | 241 | 242 | 243 | 244 | 245 | 246 | 247 | 248 |
| Tensile strength (kgf/cm$^2$) | 168 | 145 | 120 | 70 | 160 | 140 | 117 | 67 | 165 | 140 | 116 | 62 |
| Tear Strength (kgf/cm$^2$) | 79 | 69 | 56 | 34 | 77 | 67 | 55 | 34 | 77 | 65 | 55 | 32 |
| Elongation (%) | 510 | 590 | 630 | 710 | 520 | 610 | 680 | 770 | 520 | 600 | 660 | 750 |
| Dimensional Stability (±4%, 80° C.) | ○ | ○ | ○ | X | ○ | ○ | ○ | X | ○ | ○ | ○ | X |
| Cold Resistant Property (−30° C.) | ○ | ○ | ○ | X | ○ | ○ | ○ | X | ○ | ○ | ○ | X |
| Calender Processability&Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <20 | <20 | <20 | <20 | <20 | <20 | <20 | <20 | <20 | <20 | <20 | <20 |

Examples 249 to 260

Examples 249 to 252 were performed by the same methods as Examples 237 to 240, respectively, except that Omya-5T by Omya Korea Company was used as the filler; Examples 253 to 256 were performed by the same methods as Examples 237 to 240, respectively, except that Omya-10 by Omya Korea Company was used as the filler; and Examples 257 to 260 were performed by the same methods as Examples 237 to 240, respectively, except that Omya-10T by Omya Korea Company was used as the filler.

TABLE 27

| | Example | | | | | | | | | | | |
|---|---|---|---|---|---|---|---|---|---|---|---|---|
| | 249 | 250 | 251 | 252 | 253 | 254 | 255 | 256 | 257 | 258 | 259 | 260 |
| Tensile strength (kgf/cm$^2$) | 162 | 136 | 109 | 55 | 157 | 128 | 102 | 51 | 152 | 121 | 93 | 44 |
| Tear Strength (kgf/cm$^2$) | 71 | 60 | 49 | 21 | 70 | 57 | 49 | 21 | 66 | 52 | 41 | 17 |
| Elongation (%) | 540 | 620 | 700 | >800 | 470 | 550 | 610 | 690 | 480 | 540 | 620 | 700 |
| Dimensional Stability (±4%, 80° C.) | ○ | ○ | ○ | X | ○ | ○ | ○ | X | ○ | ○ | ○ | X |
| Cold Resistant Property (−30° C.) | ○ | ○ | ○ | X | ○ | ○ | ○ | X | ○ | ○ | ○ | X |
| Calender Processability&Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <20 | <20 | <20 | <20 | <20 | <20 | <20 | <20 | <20 | <20 | <20 | <20 |

Examples 261 to 270

Examples 261 to 270 were performed by the same method as Example 213, except that the obliterating power improver was controlled in 5, 7.5, 10, 20, and 30 parts by weight for Examples 261 to 265, and the lubricant was controlled in 0.1, 0.5, 1, 2, and 5 parts by weight for Examples 266 to 270.

TABLE 28

| Example | 261 | 262 | 263 | 264 | 265 |
|---|---|---|---|---|---|
| Whiteness | 60 | >80 | >80 | >80 | >80 |

TABLE 29

| Example | 266 | 267 | 268 | 269 | 270 |
|---|---|---|---|---|---|
| Calender Processability &Workability | 4 | 4 | 4 | 4 | 2 |
| Post Processing Workability | 4 | 4 | 4 | 4 | 2 |

Example 271

100 parts by weight of a poly(propylene carbonate) resin (SK Innovation Company), 5 parts by weight of a liquid polymer type modified polyester by Aekyung Chemical Company as an strength controller, 5 parts by weight of a flexibilizer (DAIFATTY-101, DAIHACHI Company in Japan), 7.5 parts by weight of a obliterating power improver (KA100, Cosmo Chemistry), 20 parts by weight of a filler (Omya-2T, Omya Korea), and 2 part by weight of a lubricant (stearic acid, OCI) were put in a Henschel mixer, and then dry blended for 20 minutes. The dry blended mixture was put into a compounding extruder at 130° C. to be pelletized. This was prepared into a sheet semi-finished product through a compounding process (mixing rolls and warming rolls) and a calender process, followed by print, primer, and surface treatment processes, and a laminating process, thereby producing a decorative sheet finished product.

Examples 272 to 282

Examples 272 to 276 were performed by the same method as Example 273, except that the strength controller was controlled in 10, 20, 50, 75, and 100 parts by weight, respectively, and Examples 277 to 282 were performed by the same method as Example 273 except that SKflex by SK Innovation Company was used as the flexibilizer and controlled in 1, 2.5, 5, 10, 20, and 50 parts by weight, respectively.

TABLE 30

| | Example | | | | | | | | | | | |
|---|---|---|---|---|---|---|---|---|---|---|---|---|
| | 271 | 272 | 273 | 274 | 275 | 276 | 277 | 278 | 279 | 280 | 281 | 282 |
| Tensile strength (kgf/cm$^2$) | 144 | 152 | 165 | 188 | 215 | 235 | 215 | 191 | 170 | 158 | 146 | 123 |
| Tear Strength (kgf/cm$^2$) | 68 | 72 | 78 | 91 | 106 | 120 | 108 | 94 | 79 | 70 | 63 | 51 |
| Elongation (%) | 680 | 590 | 510 | 420 | 300 | 290 | 380 | 440 | 530 | 640 | 750 | >800 |
| Dimensional Stability (±4%, 80° C.) | ○ | ○ | ○ | ○ | ○ | ○ | ○ | ○ | ○ | ○ | ○ | ○ |
| Cold Resistant Property (−30° C.) | ○ | ○ | ○ | ○ | ○ | ○ | ○ | ○ | ○ | ○ | ○ | ○ |
| Calender Processability&Workability | 4 | 4 | 4 | 4 | 4 | 4 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <25 | <25 | <25 | <25 | <25 | <25 | <25 | <25 | <25 | <25 | <25 | <25 |

Examples 283 to 294

Examples 283 to 294 were performed by the same method as Example 273, except that DAIFATTY-101 by DAIHACHI Company was used as the flexibilizer and controlled in 1, 2.5, 5, 10, 20, and parts by weigh for Examples 283 to 288, respectively; and acrylate (PA828, LG Company) was used as the flexibilizer and controlled in 1, 2.5, 5, 10, 20, and 50 parts by weight for Examples 289 to 294, respectively.

TABLE 31

| | Example | | | | | | | | | | | |
|---|---|---|---|---|---|---|---|---|---|---|---|---|
| | 283 | 284 | 285 | 286 | 287 | 288 | 289 | 290 | 291 | 292 | 293 | 294 |
| Tensile strength(kgf/cm$^2$) | 210 | 187 | 165 | 154 | 142 | 120 | 213 | 188 | 168 | 156 | 141 | 120 |
| Tear Strength(kgf/cm$^2$) | 107 | 92 | 78 | 70 | 62 | 51 | 107 | 93 | 77 | 69 | 61 | 49 |
| Elongation(%) | 370 | 420 | 510 | 630 | 740 | >800 | 380 | 430 | 520 | 640 | 730 | >800 |
| Dimensional Stability (±4%, 80° C.) | ○ | ○ | ○ | ○ | ○ | ○ | ○ | ○ | ○ | ○ | ○ | ○ |
| Cold Resistant Property(−30° C.) | ○ | ○ | ○ | ○ | ○ | ○ | ○ | ○ | ○ | ○ | ○ | ○ |
| Calender Processability&Workability | 4 | 4 | 4 | 4 | 4 | 3 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <25 | <25 | <25 | <25 | <25 | <25 | <25 | <25 | <25 | <25 | <25 | <25 |

Examples 295 to 306

Examples 295 to 306 were performed by the same method as Example 273, except that Omya-2 by Omya Korea Company was used as the filler and controlled in 20, 50, 100, and 200 parts by weight for Examples 295 to 298, respectively; Omya-2T by Omya Korea Company was used as the filler and controlled in 20, 50, 100, and 200 parts by weight for Examples 299 to 302, respectively; and Omya-5 by Omya Korea Company was used as the filler and controlled in 20, 50, 100, and 200 parts by weight for Examples to 303 to 306, respectively.

TABLE 32

| | Example | | | | | | | | | | | |
|---|---|---|---|---|---|---|---|---|---|---|---|---|
| | 295 | 296 | 297 | 298 | 299 | 300 | 301 | 302 | 303 | 304 | 305 | 306 |
| Tensile strength (kgf/cm²) | 167 | 145 | 128 | 80 | 165 | 142 | 120 | 75 | 163 | 139 | 120 | 71 |
| Tear Strength (kgf/cm²) | 78 | 67 | 58 | 33 | 78 | 68 | 57 | 34 | 75 | 62 | 53 | 30 |
| Elongation(%) | 500 | 550 | 630 | 710 | 510 | 570 | 660 | 750 | 490 | 530 | 610 | 690 |
| Dimensional Stability (±4%, 80° C.) | ○ | ○ | ○ | X | ○ | ○ | ○ | X | ○ | ○ | ○ | X |
| Cold Resistant Property(−30° C.) | ○ | ○ | ○ | X | ○ | ○ | ○ | X | ○ | ○ | ○ | X |
| Calender Processability &Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <25 | <25 | <25 | <25 | <25 | <25 | <25 | <25 | <25 | <25 | <25 | <25 |

Examples 307 to 318

Examples 307 to 310 were performed by the same methods as Examples 295 to 298, respectively, except that Omya-5T by Omya Korea Company was used as the filler; Examples 311 to 314 were performed by the same methods as Examples 295 to 298, respectively, except that Omya-10 by Omya Korea Company was used as the filler; and Examples 315 to 318 were performed by the same methods as Examples 295 to 298, respectively, except that Omya-10T by Omya Korea Company was used as the filler.

TABLE 33

| | Example | | | | | | | | | | | |
|---|---|---|---|---|---|---|---|---|---|---|---|---|
| | 307 | 308 | 309 | 310 | 311 | 312 | 313 | 314 | 315 | 316 | 317 | 318 |
| Tensile strength (kgf/cm²) | 158 | 133 | 118 | 65 | 156 | 130 | 108 | 65 | 151 | 122 | 100 | 61 |
| Tear Strength (kgf/cm²) | 71 | 58 | 48 | 26 | 71 | 62 | 49 | 24 | 69 | 60 | 44 | 22 |
| Elongation(%) | 500 | 550 | 630 | 720 | 430 | 490 | 570 | 650 | 450 | 510 | 580 | 650 |
| Dimensional Stability (±4%, 80° C.) | ○ | ○ | ○ | X | ○ | ○ | ○ | X | ○ | ○ | ○ | X |
| Cold Resistant Property(−30° C.) | ○ | ○ | ○ | X | ○ | ○ | ○ | X | ○ | ○ | ○ | X |
| Calender Processability &Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <25 | <25 | <25 | <25 | <25 | <25 | <25 | <25 | <25 | <25 | <25 | <25 |

Examples 319 to 328

Examples 319 to 328 were performed by the same method as Example 273, except that the obliterating power improver was controlled in 5, 7.5, 10, 20, and 30 parts by weight for Examples 319 to 323, respectively, and the lubricant was controlled in 0.1, 0.5, 1, 2, and 5 parts by weight for Examples 324 to 318, respectively.

TABLE 34

| Example | 319 | 320 | 321 | 322 | 323 |
|---|---|---|---|---|---|
| Whiteness | 60 | >80 | >80 | >80 | >80 |

TABLE 35

| Example | 324 | 325 | 326 | 327 | 328 |
|---|---|---|---|---|---|
| Calender Processability &Workability | 4 | 4 | 4 | 4 | 2 |

TABLE 35-continued

| Example | 324 | 325 | 326 | 327 | 328 |
|---|---|---|---|---|---|
| Post Processing Workability | 4 | 4 | 4 | 4 | 2 |

Example 329

100 parts by weight of a poly(propylene carbonate) resin (SK Innovation Company), 5 parts by weigh of polymethylmethacrylate by LG Company as the strength controller, 5 parts by weight of a flexibilizer (DAIFATTY-101, DAIHACHI Company in Japan), 7.5 parts by weight of a obliterating power improver (KA100, Cosmo Chemistry), 20 parts by weight of a filler (Omya-2T, Omya Korea), and 1 part by weight of a lubricant (stearic acid, OCI) were put in a Henschel mixer, and then dry blended for 20 minutes. The dry blended mixture was put into a compounding extruder at 160° C. to be pelletized. This was prepared into a sheet semi-finished product through a compounding process (mixing rolls and warming rolls) and a calender process, followed by print, primer, and surface treatment processes, and a laminating process, thereby producing a decorative sheet finished product.

Examples 330 to 340

Examples 330 to 340 were performed by the same method as Example 329, except that the strength controller was controlled in 10, 20, 50, 75, and 100 parts by weight for Examples 330 to 334, respectively; and SKflex by SK Innovation Company was used as the flexibilizer and controlled in 1, 2.5, 5, 10, 20, and 50 parts by weight for Examples 335 to 340, respectively.

TABLE 36

| | Example | | | | | | | | | | | |
|---|---|---|---|---|---|---|---|---|---|---|---|---|
| | 329 | 330 | 331 | 332 | 333 | 334 | 335 | 336 | 337 | 338 | 339 | 340 |
| Tensile strength(kgf/cm$^2$) | 180 | 225 | 250 | 280 | 325 | 360 | 295 | 283 | 264 | 235 | 207 | 150 |
| Tear Strength(kgf/cm$^2$) | 88 | 117 | 120 | 137 | 158 | 175 | 147 | 131 | 123 | 107 | 98 | 71 |
| Elongation(%) | 600 | 480 | 390 | 220 | 100 | 80 | 255 | 290 | 370 | 430 | 500 | 580 |
| Dimensional Stability (±4%, 80° C.) | ○ | ○ | ○ | ○ | ○ | X | ○ | ○ | ○ | ○ | ○ | ○ |
| Cold Resistant Property(−30° C.) | ○ | ○ | ○ | ○ | ○ | X | X | ○ | ○ | ○ | ○ | ○ |
| Calender Processability & Workability | 3 | 4 | 4 | 4 | 5 | 5 | 4 | 4 | 4 | 4 | 4 | 3 |
| Post Processing Workability | 3 | 4 | 4 | 4 | 4 | 4 | 4 | 4 | 4 | 4 | 4 | 4 |
| Smoke Density | 30 | <35 | <35 | <35 | <40 | <40 | <35 | <35 | <35 | <35 | <35 | <35 |

Examples 341 to 352

Examples 341 to 352 were performed by the same method as Example 329, except that DAIFATTY-101 by DAIHACHI Company was used as the flexibilizer and controlled in 1, 2.5, 5, 10, 20, and 50 for Examples 341 to 346, respectively; and acrylate (PA828, LG Company) was used as the flexibilizer and controlled in 1, 2.5, 5, 10, 20, and 50 for Examples 347 to 352, respectively.

TABLE 37

| | Example | | | | | | | | | | | |
|---|---|---|---|---|---|---|---|---|---|---|---|---|
| | 341 | 342 | 343 | 344 | 345 | 346 | 347 | 348 | 349 | 350 | 351 | 352 |
| Tensile strength(kgf/cm$^2$) | 293 | 270 | 250 | 228 | 195 | 145 | 280 | 263 | 239 | 205 | 188 | 125 |
| Tear Strength(kgf/cm$^2$) | 145 | 128 | 120 | 104 | 96 | 70 | 134 | 117 | 103 | 96 | 86 | 58 |
| Elongation(%) | 260 | 310 | 390 | 450 | 520 | 590 | 280 | 370 | 460 | 550 | 620 | 700 |
| Dimensional Stability (±4%, 80° C.) | ○ | ○ | ○ | ○ | ○ | ○ | ○ | ○ | ○ | ○ | ○ | ○ |
| Cold Resistant Property(−30° C.) | X | ○ | ○ | ○ | ○ | ○ | X | ○ | ○ | ○ | ○ | ○ |
| Calender Processability & Workability | 4 | 4 | 4 | 4 | 4 | 3 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <35 | <35 | <35 | <35 | <35 | <35 | <35 | <35 | <35 | <35 | <35 | <35 |

Examples 353 to 364

Examples 353 to 364 were performed by the same method as Example 329, except that Omya-2 by Omya Korea Company was used as the filler and controlled in 20, 50, 100, and 200 parts by weight for Examples 353 to 356, respectively; Omya-2T by Omya Korea Company was used as the filler and controlled in 20, 50, 100, and 200 parts by weight for Examples 357 to 360, respectively; and Omya-5 by Omya Korea Company was used as the filler and controlled in 20, 50, 100, and 200 parts by weight for Examples 361 to 364, respectively.

TABLE 38

| | Example | | | | | | | | | | | |
|---|---|---|---|---|---|---|---|---|---|---|---|---|
| | 353 | 354 | 355 | 356 | 357 | 358 | 359 | 360 | 361 | 362 | 363 | 364 |
| Tensile strength (kgf/cm$^2$) | 255 | 231 | 210 | 196 | 250 | 227 | 202 | 182 | 244 | 210 | 189 | 165 |
| Tear Strength (kgf/cm$^2$) | 120 | 98 | 92 | 88 | 120 | 113 | 99 | 92 | 112 | 96 | 87 | 74 |
| Elongation(%) | 350 | 440 | 500 | 570 | 390 | 470 | 550 | 620 | 340 | 410 | 470 | 530 |
| Dimensional Stability (±4%, 80° C.) | ○ | ○ | ○ | X | ○ | ○ | ○ | X | ○ | ○ | ○ | X |
| Cold Resistant Property(−30° C.) | ○ | ○ | ○ | X | ○ | ○ | ○ | X | ○ | ○ | ○ | X |
| Calender Processability & Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <35 | <35 | <35 | <35 | <35 | <35 | <35 | <35 | <35 | <35 | <35 | <35 |

Examples 354 to 365

Examples 365 to 368 were performed by the same methods as Examples 353 to 356, respectively, except that Omya-5T by Omya Korea Company was used as the filler; Examples 369 to 372 were performed by the same methods as Examples 353 to 356, respectively, except that Omya-10 by Omya Korea Company was used as the filler; and Examples 373 to 376 were performed by the same methods as Examples 353 to 356, respectively, except that Omya-10T by Omya Korea Company was used as the filler.

TABLE 39

| | Example | | | | | | | | | | | |
|---|---|---|---|---|---|---|---|---|---|---|---|---|
| | 365 | 366 | 367 | 368 | 369 | 370 | 371 | 372 | 373 | 374 | 375 | 376 |
| Tensile strength (kgf/cm$^2$) | 237 | 201 | 169 | 140 | 235 | 201 | 165 | 137 | 227 | 190 | 157 | 125 |
| Tear Strength (kgf/cm$^2$) | 105 | 93 | 82 | 69 | 103 | 92 | 75 | 65 | 100 | 88 | 72 | 60 |
| Elongation(%) | 340 | 380 | 440 | 520 | 330 | 390 | 450 | 510 | 330 | 370 | 430 | 490 |
| Dimensional Stability (±4%, 80° C.) | ○ | ○ | ○ | X | ○ | ○ | ○ | X | ○ | ○ | ○ | X |
| Cold Resistant Property(−30° C.) | ○ | ○ | ○ | X | ○ | ○ | ○ | X | ○ | ○ | ○ | X |
| Calender Processability & Workability | 4 | 5 | 5 | 5 | 4 | 5 | 5 | 5 | 4 | 5 | 5 | 5 |

TABLE 39-continued

| | Example | | | | | | | | | | | |
|---|---|---|---|---|---|---|---|---|---|---|---|---|
| | 365 | 366 | 367 | 368 | 369 | 370 | 371 | 372 | 373 | 374 | 375 | 376 |
| Post Processing Workability | 4 | 4 | 4 | 4 | 4 | 4 | 4 | 4 | 4 | 4 | 4 | 4 |
| Smoke Density | <35 | <35 | <35 | <35 | <35 | <35 | <35 | <35 | <35 | <35 | <35 | <35 |

Examples 377 to 386

Examples 377 to 386 were performed by the same method as Example 329, except that the obliterating power improver was controlled in 5, 7.5, 10, 20, and 30 parts by weight for Examples 377 to 381, respectively, and the lubricant was controlled in 0.1, 0.5, 1, 2, and 5 parts by weight for Examples 382 to 386, respectively.

TABLE 40

| Example | 377 | 378 | 379 | 380 | 381 |
|---|---|---|---|---|---|
| Whiteness | 60 | >80 | >80 | >80 | >80 |

TABLE 41

| Example | 382 | 383 | 384 | 385 | 386 |
|---|---|---|---|---|---|
| Calender Processability &Workability | 4 | 4 | 4 | 4 | 2 |
| Post Processing Workability | 4 | 4 | 4 | 4 | 2 |

Example 387

100 parts by weight of a poly(propylene carbonate) resin (SK Innovation Company), 5 parts by weigh of ethylene vinylacetate by Samsung Total Company as the strength controller, 5 parts by weight of a flexibilizer (DAIFATTY-101, DAIHACHI Company in Japan), 7.5 parts by weight of a obliterating power improver (KA100, Cosmo Chemistry), 20 parts by weight of a filler (Omya-2T, Omya Korea), and 2 part by weight of a lubricant (stearic acid, OCI) were put in a Henschel mixer, and then dry blended for 20 minutes. The dry blended mixture was put into a compounding extruder at 120° C. to be pelletized. This was prepared into a sheet semi-finished product through a compounding process (mixing rolls and warming rolls) and a calender process, followed by print, primer, and surface treatment processes, and a laminating process, thereby producing a decorative sheet finished product.

Examples 388 to 399

Examples 388 to 399 were performed by the same method as Example 387, except that the strength controller was controlled in 10, 20, 50, 75, and 100 parts by weight for Examples 388 to 393, respectively; and SKflex by SK Innovation Company was used as the flexibilizer and controlled in 1, 2.5, 5, 10, 20, and 50 parts by weight for Examples 394 to 399, respectively.

TABLE 42

| | Example | | | | | | | | | | | |
|---|---|---|---|---|---|---|---|---|---|---|---|---|
| | 388 | 389 | 390 | 391 | 392 | 393 | 394 | 395 | 396 | 397 | 398 | 399 |
| Tensile strength(kgf/cm²) | 105 | 125 | 140 | 156 | 170 | 188 | 188 | 164 | 149 | 133 | 121 | 72 |
| Tear Strength(kgf/cm²) | 48 | 57 | 65 | 70 | 72 | 86 | 85 | 75 | 67 | 60 | 51 | 24 |
| Elongation(%) | 700 | 620 | 550 | 490 | 430 | 400 | 370 | 440 | 520 | 600 | 680 | >800 |
| Dimensional Stability (±4%, 80° C.) | ○ | ○ | ○ | ○ | ○ | ○ | ○ | ○ | ○ | ○ | ○ | ○ |
| Cold Resistant Property(−30° C.) | ○ | ○ | ○ | ○ | ○ | ○ | X | ○ | ○ | ○ | ○ | ○ |
| Calender Processability& Workability | 3 | 4 | 4 | 4 | 5 | 5 | 4 | 4 | 4 | 4 | 4 | 3 |
| Post Processing Workability | 3 | 4 | 4 | 4 | 4 | 4 | 4 | 4 | 4 | 4 | 4 | 4 |
| Smoke Density | <30 | <35 | <40 | <50 | <60 | <75 | <40 | <40 | <40 | <40 | <40 | <40 |

Examples 400 to 411

Examples 400 to 411 were performed by the same method as Example 387, except that DAIFATTY-101 by DAIHACHI Company was used as the flexibilizer and controlled in 1, 2.5, 5, 10, 20, and 50 parts by weight for Examples 400 to 405, respectively; and acrylate (PA828, LG Company) was used as the flexibilizer and controlled in 1, 2.5, 5, 10, 20, and 50 parts by weight for Examples 406 to 411, respectively.

TABLE 43

| | Example | | | | | | | | | | | |
|---|---|---|---|---|---|---|---|---|---|---|---|---|
| | 400 | 401 | 402 | 403 | 404 | 405 | 406 | 407 | 408 | 409 | 410 | 411 |
| Tensile strength(kgf/cm$^2$) | 180 | 156 | 140 | 128 | 105 | 60 | 182 | 159 | 144 | 130 | 116 | 67 |
| Tear Strength(kgf/cm$^2$) | 83 | 71 | 65 | 58 | 47 | 22 | 83 | 72 | 67 | 59 | 49 | 23 |
| Elongation(%) | 380 | 460 | 550 | 670 | >800 | >800 | 370 | 450 | 520 | 620 | 710 | >800 |
| Dimensional Stability (±4%, 80° C.) | ○ | ○ | ○ | ○ | ○ | ○ | ○ | ○ | ○ | ○ | ○ | ○ |
| Cold Resistant Property(−30° C.) | ○ | ○ | ○ | ○ | ○ | ○ | X | ○ | ○ | ○ | ○ | ○ |
| Calender Processability & Workability | 4 | 4 | 4 | 4 | 4 | 3 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <40 | <40 | <40 | <40 | <40 | <40 | <40 | <40 | <40 | <40 | <40 | <40 |

Examples 412 to 423

Examples 412 to 423 were performed by the same method as Example 387, except that Omya-2 by Omya Korea Company was used as the filler and controlled in 20, 50, 100, and 200 parts by weight for Examples 412 to 415, respectively; Omya-2T by Omya Korea Company was used as the filler and controlled in 20, 50, 100, and 200 parts by weight for Examples 416 to 419, respectively; and Omya-5 by Omya Korea Company was used as the filler and controlled in 20, 50, 100, and 200 parts by weight for Examples 420 to 423, respectively.

TABLE 44

| | Example | | | | | | | | | | | |
|---|---|---|---|---|---|---|---|---|---|---|---|---|
| | 412 | 413 | 414 | 415 | 416 | 417 | 418 | 419 | 420 | 421 | 422 | 423 |
| Tensile strength (kgf/cm$^2$) | 147 | 135 | 112 | 72 | 140 | 127 | 102 | 68 | 144 | 130 | 107 | 70 |
| Tear Strength (kgf/cm$^2$) | 66 | 63 | 57 | 24 | 65 | 60 | 53 | 23 | 64 | 61 | 55 | 23 |
| Elongation(%) | 520 | 600 | 680 | >800 | 550 | 620 | 750 | >800 | 500 | 580 | 650 | 750 |
| Dimensional Stability (±4%, 80° C.) | ○ | ○ | ○ | X | ○ | ○ | ○ | X | ○ | ○ | ○ | X |
| Cold Resistant Property(−30° C.) | ○ | ○ | ○ | X | ○ | ○ | ○ | X | ○ | ○ | ○ | X |
| Calender Processability & Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <40 | <40 | <40 | <40 | <40 | <40 | <40 | <40 | <40 | <40 | <40 | <40 |

Examples 424 to 435

Examples 424 to 427 were performed by the same methods as Examples 412 to 415, respectively, except that Omya-5T by Omya Korea Company was used as the filler; Examples 428 to 431 were performed by the same methods as Examples 412 to 415, respectively, except that Omya-10 by Omya Korea Company was used as the filler; and Examples 433 to 435 were performed by the same methods as Examples 412 to 415, respectively, except that Omya-10T by Omya Korea Company was used as the filler.

TABLE 45

| | Example | | | | | | | | | | | |
|---|---|---|---|---|---|---|---|---|---|---|---|---|
| | 424 | 425 | 426 | 427 | 428 | 429 | 430 | 431 | 432 | 433 | 434 | 435 |
| Tensile strength (kgf/cm$^2$) | 138 | 123 | 95 | 59 | 139 | 127 | 105 | 65 | 133 | 120 | 93 | 50 |
| Tear Strength (kgf/cm$^2$) | 60 | 57 | 46 | 20 | 62 | 59 | 51 | 21 | 56 | 50 | 43 | 18 |
| Elongation(%) | 510 | 590 | 660 | 770 | 480 | 550 | 620 | 700 | 470 | 530 | 600 | 680 |
| Dimensional Stability (±4%, 80° C.) | ○ | ○ | ○ | X | ○ | ○ | ○ | X | ○ | ○ | ○ | X |
| Cold Resistant Property(−30° C.) | ○ | ○ | ○ | X | ○ | ○ | ○ | X | ○ | ○ | ○ | X |
| Calender Processability &Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <40 | <40 | <40 | <40 | <40 | <40 | <40 | <40 | <40 | <40 | <40 | <40 |

Examples 436 to 445

Examples 436 to 445 were performed by the same method as Example 388, except that the obliterating power improver was controlled in 5, 7.5, 10, 20, and 30 parts by weight for Examples 436 to 440, respectively, and the lubricant was controlled in 0.1, 0.5, 1, 2, and 5 parts by weight for Examples 441 to 445, respectively.

TABLE 46

| Example | 436 | 437 | 438 | 439 | 440 |
|---|---|---|---|---|---|
| Whiteness | 60 | >80 | >80 | >80 | >80 |

TABLE 47

| Example | 441 | 442 | 443 | 444 | 445 |
|---|---|---|---|---|---|
| Calender Processability &Workability | 4 | 4 | 4 | 4 | 2 |
| Post Processing Workability | 4 | 4 | 4 | 4 | 2 |

Example 446

100 parts by weight of a poly(propylene carbonate) resin (SK Innovation Company), 5 parts by weigh of thermoplastic copolyester elastomer by LG Chemical Company as the strength controller, 5 parts by weight of a flexibilizer (DAIFATTY-101, DAIHACHI Company in Japan), 7.5 parts by weight of a obliterating power improver (KA100, Cosmo Chemistry), 20 parts by weight of a filler (Omya-2T, Omya Korea), and 2 part by weight of a lubricant (stearic acid, OCI) were put in a Henschel mixer, and then dry blended for 20 minutes. The dry blended mixture was put into a compounding extruder at 150° C. to be pelletized. This was prepared into a sheet semi-finished product through a compounding process (mixing rolls and warming rolls) and a calender process, followed by print, primer, and surface treatment processes, and a laminating process, thereby producing a decorative sheet finished product.

Examples 447 to 457

Examples 447 to 457 were performed by the same method as Example 446, except that the strength controller was controlled in 10, 20, 50, 75, and 100 parts by weight for Examples 447 to 451, respectively; and SKflex by SK Innovation Company was used as the flexibilizer and controlled in 1, 2.5, 5, 10, 20, and 50 parts by weight for Examples 452 to 457, respectively.

TABLE 48

| | Example | | | | | | | | | | | |
|---|---|---|---|---|---|---|---|---|---|---|---|---|
| | 446 | 447 | 448 | 449 | 450 | 451 | 452 | 453 | 454 | 455 | 456 | 457 |
| Tensile strength(kgf/cm$^2$) | 120 | 150 | 175 | 205 | 234 | 265 | 218 | 197 | 181 | 166 | 145 | 110 |
| Tear Strength(kgf/cm$^2$) | 55 | 69 | 82 | 97 | 119 | 132 | 115 | 97 | 85 | 74 | 67 | 57 |
| Elongation(%) | 680 | 610 | 500 | 410 | 340 | 270 | 370 | 430 | 490 | 550 | 620 | 720 |
| Dimensional Stability (±4%, 80° C.) | ○ | ○ | ○ | ○ | ○ | ○ | ○ | ○ | ○ | ○ | ○ | ○ |
| Cold Resistant Property(−30° C.) | ○ | ○ | ○ | ○ | ○ | ○ | ○ | ○ | ○ | ○ | ○ | ○ |

TABLE 48-continued

|  | Example | | | | | | | | | | | |
|---|---|---|---|---|---|---|---|---|---|---|---|---|
|  | 446 | 447 | 448 | 449 | 450 | 451 | 452 | 453 | 454 | 455 | 456 | 457 |
| Calender Processability& Workability | 3 | 4 | 4 | 4 | 5 | 5 | 4 | 4 | 4 | 4 | 4 | 3 |
| Post Processing Workability | 3 | 4 | 4 | 4 | 4 | 4 | 4 | 4 | 4 | 4 | 4 | 4 |
| Smoke Density | <30 | <30 | <35 | <40 | <40 | <40 | <30 | <30 | <30 | <30 | <30 | <30 |

Examples 458 to 469

Examples 458 to 469 were performed by the same method as Example 446, except that DAIFATTY-101 by DAIHACHI Company was used as the flexibilizer and controlled in 1, 2.5, 5, 10, 20, and 50 for Examples 458 to 463, respectively; and acrylate (PA828, LG Chemical Company) parts by weight was used as the flexibilizer and controlled in 1, 2.5, 5, 10, 20, and 50 parts by weight for Examples 464 to 469, respectively.

TABLE 49

|  | Example | | | | | | | | | | | |
|---|---|---|---|---|---|---|---|---|---|---|---|---|
|  | 458 | 459 | 460 | 461 | 462 | 463 | 464 | 465 | 466 | 467 | 468 | 469 |
| Tensile strength(kgf/cm$^2$) | 215 | 192 | 175 | 160 | 137 | 105 | 216 | 195 | 177 | 162 | 140 | 107 |
| Tear Strength(kgf/cm$^2$) | 114 | 97 | 82 | 73 | 62 | 53 | 113 | 95 | 83 | 75 | 65 | 55 |
| Elongation(%) | 380 | 440 | 500 | 580 | 670 | >800 | 370 | 440 | 510 | 570 | 640 | 750 |
| Dimensional Stability (±4%, 80° C.) | ○ | ○ | ○ | ○ | ○ | ○ | ○ | ○ | ○ | ○ | ○ | ○ |
| Cold Resistant Property(−30° C.) | ○ | ○ | ○ | ○ | ○ | ○ | ○ | ○ | ○ | ○ | ○ | ○ |
| Calender Processability& Workability | 4 | 4 | 4 | 4 | 4 | 3 | 4 | 4 | 4 | 4 | 4 | 3 |
| Post Processing Workability | 4 | 4 | 4 | 4 | 4 | 4 | 4 | 4 | 4 | 4 | 4 | 4 |
| Smoke Density | <35 | <35 | <35 | <35 | <35 | <35 | <35 | <35 | <35 | <35 | <35 | <35 |

Examples 470 to 481

Examples 470 to 481 were performed by the same method as Example 446, except that Omya-2 by Omya Korea Company was used as the filler and controlled in 20, 50, 100, and 200 parts by weight for Examples 470 to 473, respectively; Omya-2T by Omya Korea Company was used as the filler and controlled in 20, 50, 100, and 200 parts by weight for Examples 474 to 477, respectively; and Omya-5 by Omya Korea Company was used as the filler and controlled in 20, 50, 100, and 200 parts by weight for Examples 478 to 481, respectively.

TABLE 50

|  | Example | | | | | | | | | | | |
|---|---|---|---|---|---|---|---|---|---|---|---|---|
|  | 470 | 471 | 472 | 473 | 474 | 475 | 476 | 477 | 478 | 479 | 480 | 481 |
| Tensile strength (kgf/cm$^2$) | 177 | 162 | 141 | 94 | 175 | 158 | 130 | 86 | 171 | 155 | 129 | 80 |
| Tear Strength (kgf/cm$^2$) | 83 | 73 | 63 | 43 | 82 | 73 | 59 | 42 | 75 | 68 | 57 | 35 |

TABLE 50-continued

| | Example | | | | | | | | | | | |
|---|---|---|---|---|---|---|---|---|---|---|---|---|
| | 470 | 471 | 472 | 473 | 474 | 475 | 476 | 477 | 478 | 479 | 480 | 481 |
| Elongation(%) | 470 | 550 | 610 | 700 | 500 | 570 | 640 | 700 | 460 | 520 | 590 | 660 |
| Dimensional Stability (±4%, 80° C.) | ○ | ○ | ○ | X | ○ | ○ | ○ | X | ○ | ○ | ○ | X |
| Cold Resistant Property(−30° C.) | ○ | ○ | ○ | X | ○ | ○ | ○ | X | ○ | ○ | ○ | X |
| Calender Processability &Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <35 | <35 | <30 | <30 | <35 | <35 | <30 | <30 | <35 | <35 | <30 | <30 |

Examples 482 to 493

Examples 482 to 485 were performed by the same methods as Examples 470 to 473, respectively, except that Omya-5T by Omya Korea Company was used as the filler; Examples 486 to 489 were performed by the same methods as Examples 470 to 473, respectively, except that Omya-10 by Omya Korea Company was used as the filler; and Examples 490 to 493 were performed by the same methods as Examples 470 to 473, respectively, except that Omya-10T by Omya Korea Company was used as the filler.

TABLE 51

| | Example | | | | | | | | | | | |
|---|---|---|---|---|---|---|---|---|---|---|---|---|
| | 482 | 483 | 484 | 485 | 486 | 487 | 488 | 489 | 490 | 491 | 492 | 493 |
| Tensile strength (kgf/cm$^2$) | 165 | 144 | 115 | 69 | 160 | 143 | 113 | 69 | 148 | 121 | 100 | 52 |
| Tear Strength (kgf/cm$^2$) | 70 | 62 | 53 | 30 | 70 | 61 | 52 | 28 | 65 | 53 | 46 | 22 |
| Elongation(%) | 420 | 490 | 570 | 640 | 400 | 470 | 550 | 630 | 380 | 460 | 510 | 600 |
| Dimensional Stability (±4%, 80° C.) | ○ | ○ | ○ | X | ○ | ○ | ○ | X | ○ | ○ | ○ | X |
| Cold Resistant Property(−30° C.) | ○ | ○ | ○ | X | ○ | ○ | ○ | X | ○ | ○ | ○ | X |
| Calender Processability &Workability | 4 | 5 | 5 | 5 | 4 | 5 | 5 | 5 | 4 | 5 | 5 | 5 |
| Post Processing Workability | 4 | 4 | 4 | 4 | 4 | 4 | 4 | 4 | 4 | 4 | 4 | 4 |
| Smoke Density | <35 | <35 | <30 | <30 | <35 | <35 | <30 | <30 | <35 | <35 | <30 | <30 |

Examples 494 to 503

Examples 494 to 503 were performed by the same method as Example 446, except that the obliterating power improver was controlled in 5, 7.5, 10, 20, and 30 parts by weight for Examples 494 to 498, and the lubricant was controlled in 0.1, 0.5, 1, 2, and 5 parts by weight for Examples 499 to 503.

TABLE 52

| Example | 494 | 495 | 496 | 497 | 498 |
|---|---|---|---|---|---|
| Whiteness | 60 | >80 | >80 | >80 | >80 |

TABLE 53

| Example | 499 | 500 | 501 | 502 | 503 |
|---|---|---|---|---|---|
| Calender Processability & Workability | 4 | 4 | 4 | 4 | 2 |
| Post Processing Workability | 4 | 4 | 4 | 4 | 2 |

As described above, products made of the eco-friendly poly(propylene carbonate) resin composition according to the present invention never generate harmful gases and dioxine at the time of combustion, which are big weaknesses of polyvinyl chloride materials. In addition, the present invention has a smoke density corresponding to about 1/600 of that of the polyvinyl chloride resin, and thus exhibits excellent flameproofing property, thereby never generating any harmful gases during processing or the use of products. Furthermore, the present invention can efficiently utilize carbon dioxide, which is a major contributor to global warming, and can remarkably improve physical properties, such as flexibility, strength, stretching property, and the like, above the level of the existing polyvinyl chloride resin, even without using phthalate based plasticizers and stabilizers, which are processing additives harmful to the human body.

Furthermore, the present invention is not easily broken in the winter time nor requires any post processing treatment, such as printing, surface treatment, and the like, thereby improving economic feasibility, by applying a calender processing method allowing mass production, rather than an extrusion processing method, which is regarded as the biggest disadvantage of alternatives for the existing polyvinyl chloride.

What is claimed is:

1. A resin composition for a sheet, comprising a poly(alkylene carbonate) resin by copolymerization of carbon dioxide and at least one of epoxide compound selected from the group consisting of (C2-C20)alkyleneoxide substituted or unsubstituted with halogen, (C1-C20)alkyloxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkyloxy, (C6-C20)aryloxy or (C6-C20)ar(C1-C20)alkyl(aralkyl)oxy; and (C8-C20)styreneoxide substituted or unsubstituted with halogen, (C1-C20)alkyloxy, (C6-C20)aryloxy, (C6-C20)ar(C1-C20)alkyl(aralkyl)oxy, or (C1-C20)alkyl.

2. The resin composition for a sheet of claim 1, wherein the poly(alkylene carbonate) resin is produced by copolymerization of polypropylene oxide and carbon dioxide.

3. The resin composition for a sheet of claim 1, wherein the resin composition includes 0.1 to 100 parts by weight of an strength controller, 0.1 to 50 parts by weight of a flexibilizer, 0.1 to 200 parts by weight of a filler, and 0.1 to 5 parts by weight of a lubricant, based on 100 parts by weight of the poly(alkylene carbonate) resin.

4. The resin composition for a sheet of claim 3, wherein the resin composition further includes 0.1 to 5 parts by weight of a compatibilizer based on 100 parts by weight of the poly(alkylene carbonate) resin.

5. The resin composition for a sheet of claim 3, wherein the resin composition further includes 0.1 to 30 parts by weight of an impact modifier based on 100 parts by weight of the poly(alkylene carbonate) resin.

6. The resin composition for a sheet of claim 3, wherein the resin composition further includes 0.5 to 20 parts by weight of a foaming agent or 0.1 to 200 parts by weight of a flame retardant agent, based on 100 parts by weight of the poly(alkylene carbonate) resin.

7. The resin composition for a sheet of claim 3, wherein the strength controller is at least one selected from polyethylene, polypropylene, ethylene vinyl acetate, polymethylmethacrylate, polylactic acid, polyester, and thermoplastic copolyester elastomer.

8. The resin composition for a sheet of claim 3, wherein the flexibilizer is at least one selected from acrylate based compounds or glutaric acid compounds.

9. The resin composition for a sheet of claim 3, wherein the filler is at least one selected from calcium carbonate, talc, white clay, magnesium carbonate, barium carbonate, aluminum hydroxide, calcium hydroxide, magnesium hydroxide, zinc oxide, white carbon, amorphous silica, a melamine resin and an urea resin.

10. The resin composition for a sheet of claim 3, wherein the lubricant is at least one selected from stearic acid and dioctylterephthalate.

11. The resin composition for a sheet of claim 5, wherein the impact modifier is at least one selected from methylmethacrylate-butadiene-styrene copolymer, acrylic based compounds, and chlorinated polyethylene compounds.

12. The resin composition for a sheet of claim 6, wherein the foaming agent is at least one selected from the group consisting of an inorganic type foaming agent including sodium bicarbonate, ammonium carbonate, ammonium bicarbonate, ammonium nitrite, an azide compound, sodium borohydride, and soft metal, and an organic type foaming agent including azodicarbonamide (ADCA), N, N'-dinitrosopentamethylenetetramine (DNPA), 4,4'-oxybis(benzenesulfonylhydrazide) (OBSH), and p-toluenesulfonylhydrazide (TSH), and the flame retardant agent is at least one selected from the group consisting of phosphorus based compounds, silicon based compounds, halogen based compounds, and metal hydride compounds.

* * * * *